US010836865B2

(12) United States Patent
Bara et al.

(10) Patent No.: US 10,836,865 B2
(45) Date of Patent: Nov. 17, 2020

(54) IONIC POLYAMIDE AND POLYAMIDE-IMIDE MATERIALS AND METHODS OF USE

(71) Applicant: The Board of Trustees of The University of Alabama, Tuscaloosa, AL (US)

(72) Inventors: Jason Edward Bara, Tuscaloosa, AL (US); Kathryn E. O'Harra, Ft. Worth, TX (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 95 days.

(21) Appl. No.: 15/896,513

(22) Filed: Feb. 14, 2018

(65) Prior Publication Data

US 2018/0230272 A1 Aug. 16, 2018

Related U.S. Application Data

(60) Provisional application No. 62/458,702, filed on Feb. 14, 2017.

(51) Int. Cl.
| | | |
|---|---|---|
| *C08G 73/14* | (2006.01) | |
| *B33Y 70/00* | (2020.01) | |
| *C08G 73/06* | (2006.01) | |
| *C08G 73/10* | (2006.01) | |
| *C08G 69/26* | (2006.01) | |
| *B01D 53/22* | (2006.01) | |
| *B01D 71/58* | (2006.01) | |
| *B01D 71/56* | (2006.01) | |

(52) U.S. Cl.
CPC ............ *C08G 73/14* (2013.01); *B33Y 70/00* (2014.12); *C08G 73/0616* (2013.01); *C08G 73/10* (2013.01); *B01D 53/228* (2013.01); *B01D 71/56* (2013.01); *B01D 71/58* (2013.01); *C08G 69/26* (2013.01)

(58) Field of Classification Search
CPC ...... C08G 73/14; C08G 73/616; C08G 73/10; B33Y 70/00; B01D 71/56; B01D 71/58; B01D 53/228
USPC ........................................................ 524/606
See application file for complete search history.

(56) References Cited

U.S. PATENT DOCUMENTS

| | | | | | |
|---|---|---|---|---|---|
| 3,240,761 | A | * | 3/1966 | Keim | C08G 65/2633 524/608 |
| 3,476,713 | A | * | 11/1969 | Dorsey | C08G 69/28 526/59 |
| 4,275,054 | A | * | 6/1981 | Sebag | A61K 8/88 424/65 |
| RE31,522 | E | * | 2/1984 | Rieder | C10M 107/44 508/260 |
| 4,737,304 | A | * | 4/1988 | Vo Dinh | C08G 18/603 508/243 |
| 4,780,114 | A | | 10/1988 | Quinn et al. | |
| 5,948,878 | A | * | 9/1999 | Burgess | A61K 48/00 528/272 |
| 6,484,887 | B1 | * | 11/2002 | Fukutomi | B01D 61/243 210/321.6 |
| 7,943,543 | B1 | * | 5/2011 | Liu | B01D 53/228 502/4 |
| 9,022,227 | B2 | * | 5/2015 | Na | B01D 69/12 210/500.38 |
| 9,109,092 | B2 | * | 8/2015 | Kim | C08G 81/00 |
| 9,370,773 | B2 | * | 6/2016 | Masel | B01J 41/14 |
| 2006/0100323 | A1 | * | 5/2006 | Schmidt | C08K 5/19 524/106 |
| 2008/0257507 | A1 | * | 10/2008 | Campbell | C08G 73/0286 162/111 |
| 2009/0111930 | A1 | * | 4/2009 | van Gemert | C08G 83/008 524/498 |
| 2009/0297462 | A1 | * | 12/2009 | Hessefort | A61K 8/88 424/59 |
| 2012/0186446 | A1 | * | 7/2012 | Bara | B01D 53/228 95/44 |
| 2014/0130668 | A1 | * | 5/2014 | Sano | C08G 73/1039 95/51 |
| 2014/0228523 | A1 | * | 8/2014 | Kim | C08G 81/00 525/421 |
| 2016/0032038 | A1 | * | 2/2016 | Baynes | C08F 212/08 127/29 |
| 2016/0115315 | A1 | * | 4/2016 | Ringold | C08L 33/26 523/447 |
| 2016/0185909 | A1 | * | 6/2016 | Bara | C08G 73/1085 95/44 |
| 2017/0260334 | A1 | * | 9/2017 | Tan | C08G 69/32 |

(Continued)

OTHER PUBLICATIONS

An, J.; Rosi, N. L. Tuning MOF CO2 Adsorption Properties via Cation Exchange. J. Am. Chem. Soc. 2010, 132, 5578-5579.
Anderson, E. B.; Long, T. E. Imidazole- and imidazolium-containing polymers for biology and material science applications. Polymer 2010, 51, 2447-2454.
Asano, N.; Aoki, M.; Suzuki, S.; Miyatake, K.; Uchida, H.; Watanabe, M. Aliphatic/Aromatic Polyimide Ionomers as a Proton Conductive Membrane for Fuel Cell Applications. J. Am. Chem. Soc. 2006, 128, 1762-1769.

(Continued)

*Primary Examiner* — Jane L Stanley
(74) *Attorney, Agent, or Firm* — Meunier Carlin & Curfman LLC

(57) ABSTRACT

Disclosed are compositions and methods of preparing ionic polyamides. Also disclosed are compositions and methods of preparing ionic polyamide-imides. Additionally, disclosed herein are compositions comprising the ionic polyamides or polyamide-imides. The compositions comprising the ionic polyamides or polyamide-imides can include an ionic liquid. The disclosed polyamides and polyamide-imides can be utilized for three-dimensional printing or to capture gases.

22 Claims, No Drawings

(56) References Cited

U.S. PATENT DOCUMENTS

2019/0275199 A1* 9/2019 Rogers .................. B33Y 10/00

OTHER PUBLICATIONS

Bara, J. E.; Camper, D. E.; Gin, D. L.; Noble, R. D. Room-Temperature Ionic Liquids and Composite Materials: Platform Technologies for CO2 Capture. Acc. Chem. Res. 2010, 43, 152-159.

Bara, J. E.; Carlisle, T. K.; Gabriel, C. J.; Camper, D.; Finotello, A.; Gin, D. L.; Noble, R. D., Guide to CO2 Separations in Imidazolium-Based Room-Temperature Ionic Liquids. Ind. Eng. Chem. Res. 2009, 48, 2739-2751.

Bara, J. E.; Gabriel, C. J.; Hatakeyama, E. S.; Carlisle, T. K.; Lessmann, S.; Noble, R. D.; Gin, D. L. Improving CO2 selectivity in polymerized room-temperature ionic liquid gas separation membranes through incorporation of polar substituents. J. Membr. Sci. 2008, 321, 3-7.

Bara, J. E.; Gabriel, C. J.; Lessmann, S.; Carlisle, T. K.; Finotello, A.; Gin, D. L.; Noble, R. D. Enhanced CO2 separation selectivity in oligo(ethylene glycol) functionalized room-temperature ionic liquids. Ind. Eng. Chem. Res. 2007, 46, 5380-5386.

Bara, J. E.; Gin, D. L.; Noble, R. D. Effect of Anion on Gas Separation Performance of Polymer-Room-Temperature Ionic Liquid Composite Membranes. Ind. Eng. Chem. Res. 2008, 47, 9919-9924.

Bara, J. E.; Hatakeyama, E. S.; Gabriel, C. J.; Zeng, X. H.; Lessmann, S.; Gin, D. L.; Noble, R. D. Synthesis and light gas separations in cross-linked gemini room temperature ionic liquid polymer membranes. J. Membr. Sci. 2008, 316, 186-191.

Bara, J. E.; Hatakeyama, E. S.; Gin, D. L.; Noble, R. D. Improving CO2 permeability in polymerized room-temperature ionic liquid gas separation membranes through the formation of a solid composite with a room-temperature ionic liquid. Polym. Advan. Technol. 2008, 19, 1415-1420.

Bara, J. E.; Hatakeyama, E. S.; Wiesenauer, B. R.; Zeng, X. H.; Noble, R. D.; Gin, D. L. Thermotropic liquid crystal behaviour of gemini imidazolium-based ionic amphiphiles. Liq. Cryst. 2010, 37, 1587-1599.

Bara, J. E.; Hoek, E. M. V.; Tarabara, V. V. Ionic Liquids in Gas Separation Membranes. In Encyclopedia of Membrane Science and Technology, John Wiley & Sons, Inc.: 2013, 23 oages.

Bara, J. E.; Kaminski, A. K.; Noble, R. D.; Gin, D. L. Influence of nanostructure on light gas separations in cross-linked lyotropic liquid crystal membranes. J. Membr. Sci. 2007, 288, 13-19.

Bara, J. E.; Lessmann, S.; Gabriel, C. J.; Hatakeyama, E. S.; Noble, R. D.; Gin, D. L., Synthesis and performance of polymerizable room-temperature ionic liquids as gas separation membranes. Ind. Eng.Chem. Res. 2007, 46, 5397-5404.

Bara, J. E.; Noble, R. D.; Gin, D. L. Effect of "Free" Cation Substituent on Gas Separation performance of Polymer-Room-Temperature Ionic Liquid Composite Membranes. Ind. Eng. Chem. Res.2009, 48, 4607-4610.

Bara, J. E.; Shannon, M. S. Beyond 1,3-difunctionalized imidazolium cations. Nanomater. Energy 2012, 1, 237-242.

Bates, E. D.; Mayton, R. D.; Ntai, I.; Davis, J. H. CO2 capture by a task-specific ionic liquid. J. Am. Chem. Soc. 2002, 124, 926-927.

Binnemans, K. Ionic liquid crystals. Chem. Rev. 2005, 105, (11), 4148-4204.

Budd, P. M.; McKeown, N. B. Highly permeable polymers for gas separation membranes. Polym. Chem. 2010, 1, 63-68.

Budd, P. M.; McKeown, N. B.; Ghanem, B. S.; Msayib, K. J.; Fritsch, D.; Starannikova, L.; Bclov, N.; Sanfirova, O.; Yampolskii, Y.; Shantarovich, V. Gas permeation parameters and other physicochemical properties of a polymer of intrinsic microporosity: Polybenzodioxane PIM-1. J. Membr. Sci. 2008, 325, 851-860.

Budd, P. M.; Msayib, K. J.; Tattershall, C. E.; Ghanem, B. S.; Reynolds, K. J.; McKeown, N. B.; Fritsch, D. Gas separation membranes from polymers of intrinsic microporosity. J. Membr. Sci. 2005, 251, 263-269.

Calle, M.; Lee, Y. M. Thermally Rearranged (TR) Poly(ether-benzoxazole) Membranes for Gas Separation. Macromolecules 2011, 44, 1156-1165.

Camper, D.; Bara, J. E.; Gin, D. L.; Noble, R. D. Room-Temperature Ionic Liquid-Amine Solutions: Tunable Solvents for Efficient and Reversible Capture of CO2. Ind. Eng. Chem. Res. 2008, 47, 8496-8498.

Camper, D.; Bara, J.; Koval, C.; Noble, R. Bulk-fluid solubility and membrane feasibility of Rmimbased room-temperature ionic liquids. Ind. Eng. Chem. Res. 2006, 45, 6279-6283.

Carlisle, T. K.; Bara, J. E.; Lafrate, A. L.; Gin, D. L.; Noble, R. D. Main-chain imidazolium polymer membranes for CO2 separations: An initial study of a new ionic liquid-inspired platform. J. Membr. Sci. 2010, 359, 37-43.

Carlisle, T. K.; McDanel, W. M.; Cowan, M. G.; Noble, R. D.; Gin, D. L. Vinyl-Functionalized Poly(imidazolium)s: A Curable Polymer Platform for Cross-Linked Ionic Liquid Gel Synthesis. Chem.Mater. 2014, 26, 1294-1296.

Carlisle, T. K.; Nicodemus, G. D.; Gin, D. L.; Noble, R. D. CO2/light gas separation performance of cross-linked poly(vinylimidazolium) gel membranes as a function of ionic liquid loading and cross-linker content. J. Membr. Sci. 2012, 397-398, 24-37.

Carlisle, T. K.; Wiesenauer, E. F.; Nicodemus, G. D.; Gin, D. L.; Noble, R. D. Ideal CO2/Light Gas Separation Performance of Poly(vinylimidazolium) Membranes and Poly(vinylimidazolium)-Ionic Liquid Composite Films. Ind. Eng. Chem. Res. 2013, 52, 1023-1032.

Carter, B. M.; Wiesenauer, B. R.; Hatakeyama, E. S.; Barton, J. L.; Noble, R. D.; Gin, D. L. Glycerol-Based Bicontinuous Cubic Lyotropic Liquid Crystal Monomer System for the Fabrication of Thin-Film Membranes with Uniform Nanopores. Chem. Mater. 2012, 24, 4005-4007.

Chen, B.; Xiang, S.; Qian, G. Metal-Organic Frameworks with Functional Pores for Recognition of Small Molecules. Acc. Chem. Res. 2010, 43, 1115-1124.

Chen, J.-C.; Wu, J.-A.; Chen, K.-H. Synthesis and characterization of novel imidazoliumfunctionalized polyimides for high temperature proton exchange membrane fuel cells. RSC Advan. 2016, 6, 33959-33970.

Choi, J. I.; Jung, C. H.; Han, S. H.; Park, H. B.; Lee, Y. M. Thermally rearranged (TR) poly(benzoxazole-co-pyrrolone) membranes tuned for high gas permeability and selectivity. J. Membr. Sci. 2010, 349, 358-368.

Do, Y. S.; Lee, W. H.; Seong, J. G.; Kim, J. S.; Wang, H. H.; Doherty, C. M.; Hill, A. J.; Lee, Y. M. Thermally rearranged (TR) bismaleimide-based network polymers for gas separation membranes. Chem. Commun. 2016, 52, 13556-13559.

Emmler, T.; Heinrich, K.; Fritsch, D.; Budd, P. M.; Chaukura, N.; Ehlers, D.; Raetzke, K.; Faupel, F. Free Volume Investigation of Polymers of Intrinsic Microporosity (PIMs): PIM-1 and PIM1 Copolymers Incorporating Ethanoanthracene Units. Macromolecules 2010, 43, 6075-6084.

Frisch, H. L., The time lag in diffusion. J. Phys. Chem. 1957, 61, 93-5.

Fumino, K.; Peppel, T.; Geppert-Rybczynska, M.; Zaitsau, D. H.; Lehmann, J. K.; Verevkin, S. P.; Kockerling, M.; Ludwig, R. The influence of hydrogen bonding on the physical properties of ionic liquids. Phys. Chem. Chem. Phys. 2011, 13, 14064-14075.

Fumino, K.; Wulf, A.; Ludwig, R. The potential role of hydrogen bonding in aprotic and proticionic liquids. Phys. Chem. Chem. Phys. 2009, 11, 8790-8794.

Furukawa, H.; Ko, N.; Go, Y. B.; Aratani, N.; Choi, S. B.; Choi, E.; Yazaydin, A. O.; Snurr, R. Q.; O'Keeffe, M.; Kim, J.; Yaghi, O. M. Ultrahigh Porosity in Metal-Organic Frameworks. Science 2010, 329, 424-428.

Gan, Q.; Rooney, D.; Xue, M.; Thompson, G.; Zou, Y. An experimental study of gas transport and separation properties of ionic liquids supported on nanofiltration membranes. J. Membr. Sci. 2006, 280, 948-956.

Ghanem, B. S.; McKeown, N. B.; Budd, P. M.; Al-Harbi, N. M.; Fritsch, D.; Heinrich, K.; Starannikova, L.; Tokarev, A.; Yampolskii, Y. Synthesis, Characterization, and Gas Permeation Properties of a

(56) References Cited

OTHER PUBLICATIONS

Novel Group of Polymers with Intrinsic Microporosity: PIM-Polyimides. Macromolecules 2009, 42, 7881-7888.

Gin, D. L.; Noble, R. D. Designing the next generation of chemical separation membranes. Science 2011, 332, 674-676.

Green, M. D.; Allen Jr, M. H.; Dennis, J. M.; Cruz, D. S.-d. l.; Gao, R.; Winey, K. I.; Long, T. E. Tailoring macromolecular architecture with imidazole functionality: A perspective for controlled polymerization processes. Eur. Polym. J. 2011, 47, 486-496.

Gu, Y. Y.; Lodge, T. P. Synthesis and Gas Separation Performance of Triblock Copolymer Ion Gels with a Polymerized Ionic Liquid Mid-Block. Macromolecules 2011, 44, 1732-1736.

Guo, R.; Sanders, D. F.; Smith, Z. P.; Freeman, B. D.; Paul, D. R.; McGrath, J. E. Synthesis and characterization of Thermally Rearranged (TR) polymers: influence of ortho-positioned functional groups of polyimide precursors on TR process and gas transport properties. J. Mater. Chem. A 2013, 1, 262-272.

Gupta, K. M.; Chen, Y.; Hu, Z.; Jiang, J. Metal-organic framework supported ionic liquid membranes for $CO_2$ capture: anion effects. Phys. Chem. Chem. Phys. 2012, 14, 5785-5794.

Hayes, R.; Warr, G. G.; Atkin, R. Structure and Nanostructure in Ionic Liquids. Chem. Rev. 2015, 115, 6357-6426.

Hou, X. J.; Li, H. Q., Unraveling the High Uptake and Selectivity of $CO_2$ in the Zeolitic Imidazolate Frameworks ZIF-68 and ZIF-69. J. Phys. Chem. C 2010, 114, 13501-13508.

Hudiono, Y. C.; Carlisle, T. K.; LaFrate, A. L.; Gin, D. L.; Noble, R. D. Novel mixed matrix membranes based on polymerizable room-temperature ionic liquids and SAPO-34 particles to improve $CO_2$ separation. J. Membr. Sci. 2011, 370, 141-148.

Ichikawa, T.; Yoshio, M.; Hamasaki, A.; Kagimoto, J.; Ohno, H.; Kato, T. 3D Interconnected Ionic Nano-Channels Formed in Polymer Films: Self-Organization and Polymerization of Thermotropic Bicontinuous Cubic Liquid Crystals. J. Am. Chem. Soc. 2011, 133, 2163-2169.

Ichikawa, T.; Yoshio, M.; Hamasaki, A.; Mukai, T.; Ohno, H.; Kato, T. Self-organization of roomtemperature ionic liquids exhibiting liquid-crystalline bicontinuous cubic phases: Formation of nano-ion channel networks. J. Am. Chem. Soc. 2007, 129, 10662-10663.

Imaizumi, S.; Ohtsuki, Y.; Yasuda, T.; Kokubo, H.; Watanabe, M. Printable Polymer Actuators from Ionic Liquid, Soluble Polyimide, and Ubiquitous Carbon Materials. ACS Appl. Mater. Interf. 2013, 5, 6307-6315.

Jiang, Y.; Willmore, F. T.; Sanders, D.; Smith, Z. P.; Ribeiro, C. P.; Doherty, C. M.; Thornton, A.; Hill, A. J.; Freeman, B. D.; Sanchez, I. C. Cavity size, sorption and transport characteristics of thermally rearranged (TR) polymers. Polymer 2011, 52, 2244-2254.

Kammakakam, I.; Nam, S.; Kim, T.-H. PEG-imidazolium-functionalized 6FDA-durene polyimide as a novel polymeric membrane for enhanced $CO_2$ separation. RSC Advan 2016, 6, 31083-31091.

Kanehashi, S.; Kishida, M.; Kidesaki, T.; Shindo, R.; Sato, S.; Miyakoshi, T.; Nagai, K. $CO_2$ separation properties of a glassy aromatic polyimide composite membranes containing high-content 1-butyl-3-methylimidazolium bis(trifluoromethylsulfonyl)imide ionic liquid. J. Membr. Sci. 2013, 430, 211-222.

Kato, T. From Nanostructured Liquid Crystals to Polymer-Based Electrolytes. Angew. Chem., Int. Ed. 2010, 49, 7847-7848.

Keskin, S.; van Heest, T. M.; Sholl, D. S., Can Metal-Organic Framework Materials Play a Useful Role in Large-Scale Carbon Dioxide Separations? ChemSusChem 2010, 3, 879-891.

Kim, T. H.; Koros, W. J.; Husk, G. R.; O'Brien, K. C. Relationship between gas separation properties and chemical structure in a series of aromatic polyimides. J. Membr. Sci. 1988, 37, 45-62.

Kong, H.; Teng, C.; Liu, X.; Thou, J.; Zhong, H.; Zhang, Y.; Han, K.; Yu, M. Simultaneously improving the tensile strength and modulus of aramid fiber by enhancing amorphous phase in supercritical carbon dioxide. RSC Advan. 2014, 4, 20599-20604.

Koros, W. J.; Mahajan, R. Pushing the limits on possibilities for large scale gas separation: which strategies? J. Membr. Sci. 2000, 175, 181-196.

Laciak, D. V.; Pez, G. P.; Burban, P. M. Molten salt facilitated transport membranes. Part 2. Separation of ammonia from nitrogen and hydrogen at high temperatures. J. Membr. Sci. 1992, 65, 31-8.

Lee, M.; Choi, U. H.; Salas-de la Cruz, D.; Mittal, A.; Winey, K. I.; Colby, R. H.; Gibson, H. W., Imidazolium Polyesters: Structure-Property Relationships in Thermal Behavior, Ionic Conductivity, and Morphology. Adv. Funct. Mater. 2011, 21, 708-717.

Li, P.; Coleman, M. R. Synthesis of room temperature ionic liquids based random copolyimides for gas separation applications. Eur. Polym. J. 2013, 49, 482-491.

Li, P.; Paul, D. R.; Chung, T.-S. High performance membranes based on ionic liquid polymers for $CO_2$ separation from the flue gas. Green Chem. 2012, 14, 1052-1063.

Li, P.; Pramoda, K. P.; Chung, T. S., CO(2) Separation from Flue Gas Using Polyvinyl-(Room Temperature Ionic Liquid)-Room Temperature Ionic Liquid Composite Membranes. Ind. Eng. Chem. Res. 2011, 50, (15), 9344-9353.

Li, P.; Zhao, Q.; Anderson, J. L.; Varanasi, S.; Coleman, M. R. Synthesis of copolyimides based on room temperature ionic liquid diamines. J. Polym. Sci. Polym. Chem. 2010, 48, 4036-4046.

Lin, W.-H.; Vora, R. H.; Chung, T.-S. Gas transport properties of 6FDA-durene/1,4-phenylenediamine (pPDA) copolyimides. J. Polym. Sci., Part B: Polym. Phys. 2000, 38, 2703-2713.

Liu, B.; Smit, B. Molecular Simulation Studies of Separation of $CO_2/N_2$, $CO_2/CH_4$, and $CH_4/N_2$ by ZIFs. J. Phys. Chem. C 2010, 114, 8515-8522.

Lodge, T. P. Materials science—A unique platform for materials design. Science 2008, 321, 50-51.

Lu, X.-Q.; Qiao, Y.-Q.; He, J.-R.; Pan, M.; Kang, B.-S.; Su, C.-Y. Triple-Stranded Helical and Plywood-Like Arrays: Two Uncommon Framework Isomers Based on the Common One-Dimensional Chain Structures. Cryst. Growth Des. 2006, 6, 1910-1914.

Luo, S.; Liu, J.; Lin, H.; Kazanowska, B. A.; Hunckler, M. D.; Roeder, R. K.; Guo, R. Preparation and gas transport properties of triptycene-containing polybenzoxazole (PBO)-based polymers derived from thermal rearrangement (TR) and thermal cyclodehydration (TC) processes. J. Mater. Chem. A 2016, 4, 17050-17062.

Mason, C. R.; Maynard-Atem, L.; Al-Harbi, N. M.; Budd, P. M.; Bernardo, P.; Bazzarelli, F.; Clarizia, G.; Jansen, J. C. Polymer of Intrinsic Microporosity Incorporating Thioamide Functionality: Preparation and Gas Transport Properties. Macromolecules 2011, 44, 6471-6479.

Miller, A. L.; Carlisle, T. K.; LaFrate, A. L.; Voss, B. A.; Bara, J. E.; Hudiono, Y. C.; Wiesenauer, B. R.; Gin, D. L.; Noble, R. D. Design of Functionalized Room-Temperature Ionic Liquid-Based Materials for $CO_2$ Separations and Selective Blocking of Hazardous Chemical Vapors. Sep. Sci. Technol. 2012, 47, 169-177.

Millward, A. R.; Yaghi, O. M. Metal-Organic Frameworks with Exceptionally High Capacity for Storage of Carbon Dioxide at Room Temperature. J. Am. Chem. Soc. 2005, 127, 17998-17999.

Mukai, T.; Yoshio, M.; Kato, T.; Ohno, H. Effect of methyl groups onto imidazolium cation ring on liquid crystallinity and ionic conductivity of amphiphilic ionic liquids. Chem. Lett. 2004, 33, 1630-1631.

Noble, R. D.; Gin, D. L. Perspective on ionic liquids and ionic liquid membranes. J. Membr. Sci. 2011, 369, 1-4.

Noguchi, H.; Rembaum, A. Reactions of N,N,N',N'-tetramethyl-α,ω-diaminoalkanes with α,ω-dihaloalkanes. I. 1-y Reactions. Macromolecules 1972, 5, 253-60.

Park, H. B.; Han, S. H.; Jung, C. H.; Lee, Y. M.; Hill, A. J. Thermally rearranged (TR) polymer membranes for $CO_2$ separation. J. Membr. Sci. 2010, 359, 11-24.

Peppel, T.; Roth, C.; Fumino, K.; Paschek, D.; Kockerling, M.; Ludwig, R. The Influence of Hydrogen-Bond Defects on the Properties of Ionic Liquids. Angew. Chem. Int. Edit. 2011, 50, 6661-6665.

Pez, G. P.; Carlin, R. T. Molten salt facilitated transport membranes. Part 1. Separation of oxygen from air at high temperatures. J. Membr. Sci. 1992, 65, 21-30.

Rembaum, A.; Noguchi, H. Reactions of N,N,N',N'-tetramethyl-α,ω-diaminoalkanes with α,ω-dihaloalkanes. II. x-y Reactions. Macromolecules 1972, 5, 261-9.

(56) References Cited

OTHER PUBLICATIONS

Robertson, L. A.; Schenkel, M. R.; Wiesenauer, B. R.; Gin, D. L. Alkyl-bis(imidazolium) salts: a new amphiphile platform that forms thermotropic and non-aqueous lyotropic bicontinuous cubic phases. Chem. Commun. 2013, 49, 9407-9409.

Robeson, L. M. Correlation of Separation Factor versus Permeability for Polymeric Membranes. J. Membr. Sci. 1991, 62, 165-185.

Robeson, L. M. The upper bound revisited. J. Membr. Sci. 2008, 320, 390-400.

Roth, C.; Peppel, T.; Fumino, K.; Kockerling, M.; Ludwig, R. The Importance of Hydrogen Bonds for the Structure of Ionic Liquids: Single-Crystal X-ray Diffraction and Transmission and Attenuated Total Reflection Spectroscopy in the Terahertz Region. Angew. Chem. Int. Edit. 2010, 49, 10221-10224.

Rowsell, J. L. C.; Spencer, E. C.; Eckert, J.; Howard, J. A. K.; Yaghi, O. M. Gas Adsorption Sites in a Large-Pore Metal-Organic Framework. Science 2005, 309, 1350-1354.

Sanders, D. F.; Smith, Z. P.; Guo, R.; Robeson, L. M.; McGrath, J. E.; Paul, D. R.; Freeman, B. D., Energy-efficient polymeric gas separation membranes for a sustainable future: A review. Polymer 2013, 54, 4729-4761.

Sanders, D. F.; Smith, Z. P.; Ribeiro, C. P., Jr.; Guo, R.; McGrath, J. E.; Paul, D. R.; Freeman, B. D. Gas permeability, diffusivity, and free volume of thermally rearranged polymers based on 3,3'-dihydroxy-4,4'-diamino-biphenyl (HAB) and 2,2'-bis-(3,4-dicarboxyphenyl) hexafluoropropane dianhydride (6FDA). J. Membr. Sci. 2012, 409-410, 232-241.

Schenkel, M. R.; Shao, R.; Robertson, L. A.; Wiesenauer, B. R.; Clark, N. A.; Gin, D. L New ionic organic compounds containing a linear tris(imidazolium) core and their thermotropic liquid crystal behavior. Liq. Cryst. 2013, 40, 1067-1081.

Scholes, C. A.; Ribeiro, C. P.; Kentish, S. E.; Freeman, B. D. Thermal rearranged poly(benzoxazoleco-imide) membranes for CO2 separation. J. Membr. Sci. 2014, 450, 72-80.

Scovazzo, P.; Camper, D.; Kieft, J.; Poshusta, J.; Koval, C.; Noble, R. Regular solution theory and CO2 gas solubility in room-temperature ionic liquids. Ind. Eng. Chem. Res. 2004, 43, 6855-6860.

Scovazzo, P.; Kieft, J.; Finan, D. A.; Koval, C.; DuBois, D.; Noble, R. Gas separations using nonhexafluorophosphate PF6 (−) anion supported ionic liquid membranes. J. Membr. Sci. 2004, 238, 57-63.

Scovazzo, P.; Visser Ann, E.; Davis James, H.; Rogers Robin, D.; Koval Carl, A.; DuBois Dan, L.; Noble Richard, D. Supported Ionic Liquid Membranes and Facilitated Ionic Liquid Membranes. In Ionic Liquids, American Chemical Society: 2002; vol. 818, pp. 69-87.

Shamsipur, H.; Dawood, B. A.; Budd, P. M.; Bernardo, P.; Clarizia, G.; Jansen, J. C. Thermally Rearrangeable PIM-Polyimides for Gas Separation Membranes. Macromolecules 2014, 47, 5595-5606.

Shannon, M. S.; Tedstone, J. M.; Danielsen, S. P. O.; Hindman, M. S.; Bara, J. E. Properties and Performance of Ether-Functionalized Imidazoles as Physical Solvents for CO2 Separations. Energy Fuel 2013, 27, 3349-3357.

Shaplov, A. S.; Morozova, S. M.; Lozinskaya, E. I.; Vlasov, P. S.; Gouveia, A. S. L.; Tome, L. C.; Marrucho, I. M.; Vygodskii, Y. S. Turning into poly(ionic liquid)s as a tool for polyimide modification: synthesis, characterization and CO2 separation properties. Polym. Chem. 2016, 7, 580-591.

Smith, G. D.; Borodin, O.; Li, L. Y.; Kim, H.; Liu, Q.; Bara, J. E.; Gin, D. L.; Noble, R. A comparison of ether- and alkyl-derivatized imidazolium-based room-temperature ionic liquids: a molecular dynamics simulation study. Phys. Chem. Chem. Phys. 2008, 10, 6301-6312.

Smith, Z. P.; Sanders, D. F.; Ribeiro, C. P.; Guo, R.; Freeman, B. D.; Paul, D. R.; McGrath, J. E.; Swinnea, S. Gas sorption and characterization of thermally rearranged polyimides based on 3,3'- dihydroxy-4,4'-diamino-biphenyl (HAB) and 2,2'-bis-(3,4-dicarboxyphenyl) hexafluoropropane dianhydride (6FDA). J. Membr. Sci. 2012, 415-416, 558-567.

Staudt-Bickel, C.; Koros, W. J. Improvement of CO2/CH4 separation characteristics of polyimides by chemical crosslinking. J. Membr. Sci. 1999, 155, 145-154.

Stern, S. A., Polymers for gas separations: the next decade. J. Membr. Sci. 1994, 94, 1-65.

Stern, S. A.; Mi, Y.; Yamamoto, H.; St. Clair, A. K. Structure/permeability relationships of polyimide membranes: applications to the separation of gas mixtures. J. Polym. Sci., Part B: Polym. Phys. 1989, 27, 1887-909.

Sumida, K.; Rogow, D. L.; Mason, J. A.; McDonald, T. M.; Bloch, E. D.; Herm, Z. R.; Bae, T.-H.; Long, J. R. Carbon Dioxide Capture in Metal-Organic Frameworks. Chem. Rev. 2012, 112, 724-781.

Swaidan, R. J.; Ma, X.; Pinnau, I., Spirobisindane-based polyimide as efficient precursor of thermally-rearranged and carbon molecular sieve membranes for enhanced propylene/propane separation. J. Membr. Sci. 2016, 520, 983-989.

Swaidan, R.; Al-Saeedi, M.; Ghanem, B.; Litwiller, E.; Pinnau, I. Rational Design of Intrinsically Ultramicroporous Polyimides Containing Bridgehead-Substituted Triptycene for Highly Selective and Permeable Gas Separation Membranes. Macromolecules 2014, 47, 5104-5114.

Swaidan, R.; Ghanem, B.; Al-Saeedi, M.; Litwiller, E.; Pinnau, I. Role of Intrachain Rigidity in the Plasticization of Intrinsically Microporous Triptycene-Based Polyimide Membranes in Mixed-Gas CO2/CH4 Separations. Macromolecules 2014, 47, 7453-7462.

Tanaka, K.; Kita, H.; Okano, M.; Okamoto, K. Permeability and permselectivity of gases in fluorinated and nonfluorinated polyimides. Polymer 1992, 33, 585-92.

Tang, S.; Baker, G. A.; Mao, H. Ether- and alcohol-functionalized task-specific ionic liquids: attractive properties and applications. Chem. Soc. Rev. 2012, 41, 4030-4066.

Tome, L. C.; Marrucho, I. M. Ionic liquid-based materials: a platform to design engineered CO2 separation membranes. Chemical Society Reviews 2016, 45, (10), 2785-2824.

Voss, B. A.; Bara, J. E.; Gin, D. L.; Noble, R. D. Physically Gelled Ionic Liquids: Solid Membrane Materials with Liquidlike CO2 Gas Transport. Chem. Mater. 2009, 21, 3027-3029.

Wen, L. L.; Dang, D. B.; Duan, C. Y.; Li, Y. Z.; Tian, Z. F.; Meng, Q. J. 1D helix, 2D brick-wall and herringbone, and 3D interpenetration d(10) metal-organic framework structures assembled from pyridine-2,6-dicarboxylic acid N-oxide. Inorg. Chem. 2005, 44, 7161-7170.

Wickramanayake, S.; Hopkinson, D.; Myers, C.; Sui, L.; Luebke, D. Investigation of transport and mechanical properties of hollow fiber membranes containing ionic liquids for pre-combustion carbon dioxide capture. J. Membr. Sci. 2013, 439, 58-67.

Wiegand, J. R.; Smith, Z. P.; Liu, Q.; Patterson, C. T.; Freeman, B. D.; Guo, R. Synthesis and characterization of triptycene-based polyimides with tunable high fractional free volume for gas separation membranes. J. Mater. Chem. A 2014, 2, 13309-13320.

Wiesenauer, E. F.; Nguyen, P. T.; Newell, B. S.; Bailey, T. S.; Noble, R. D.; Gin, D. L. Imidazoliumcontaining, hydrophobic-ionic-hydrophilic ABC triblock copolymers: synthesis, ordered phaseseparation, and supported membrane fabrication. Soft Matter 2013, 9, 7923-7927.

Williams, S. R.; Long, T. E. Recent advances in the synthesis and structure-property relationships of ammonium ionenes. Prog. Polym. Sci. 2009, 34, 762-782.

Wind, J. D.; Paul, D. R.; Koros, W. J. Natural gas permeation in polyimide membranes. J. Membr. Sci. 2004, 228, 227-236.

Winterton, N. Solubilization of polymers by ionic liquids. J. Mater. Chem. 2006, 16, 4281-4293.

Wu, C.-G.; Chiang, C.-H. Revelation of the spatial structure of a highly crystalline and conducting polyaniline membrane constructed by epitaxial growth. CrystEngComm 2011, 13, 1406-1409.

Xiao, Y.; Low, B. T.; Hosseini, S. S.; Chung, T. S.; Paul, D. R. The strategies of molecular architecture and modification of polyimide-based membranes for CO2 removal from natural gas—A review. Prog. Polym. Sci. 2009, 34, 561-580.

Xu, S.; Ye, L. Synthesis and properties of monomer cast nylon-6-b-polyether amine copolymers with different structures. RSC Advan. 2015, 5, 32460-32468.

(56) References Cited

OTHER PUBLICATIONS

Xu, W.; Wang, L.-M.; Nieman, R. A.; Angell, C. A. Ionic Liquids of Chelated Orthoborates as Model Ionic Glassformers. J. Phys. Chem. B 2003, 107, 11749-11756.

Yazaki, S.; Funahashi, M.; Kagimoto, J.; Ohno, H.; Kato, T. Nanostructured Liquid Crystals Combining Ionic and Electronic Functions. J. Am. Chem. Soc. 2010, 132, 7702-7708.

Yazaydin, A. O.; Snurr, R. Q.; Park, T.-H.; Koh, K.; Liu, J.; LeVan, M. D.; Benin, A. I.; Jakubczak, P.; Lanuza, M.; Galloway, D. B.; Low, J. J.; Willis, R. R. Screening of Metal-Organic Frameworks for Carbon Dioxide Capture from Flue Gas Using a Combined Experimental and Modeling Approach. J. Am. Chem. Soc. 2009, 131, 18198-18199.

Yoshio, M.; Mukai, T.; Kanie, K.; Yoshizawa, M.; Ohno, H.; Kato, T. Liquid-crystalline assemblies containing ionic liquids: an approach to anisotropic ionic materials. Chem. Lett. 2002, 3, 320-321.

Zhang, C.; Cao, B.; Coleman, M. R.; Li, P. Gas transport properties in (6FDA-RTIL)-(6FDA-MDA) block copolyimides. J. Appl. Polym. Sci. 2016, 133, 43077.

Zhuang, Y.; Seong, J. G.; Lee, W. H.; Do, Y. S.; Lee, M. J.; Wang, G.; Guiver, M. D.; Lee, Y. M. Mechanically Tough, Thermally Rearranged (TR) Random/Block Poly(benzoxazole-co-imide) Gas Separation Membranes. Macromolecules 2015, 48, 5286-5299.

Wasserscheid and Keim, "Ionic Liquids—New "Solutions" for Transition Metal Catalysis." Angew Chem Int Ed Engl, 2000, 39:3772-3789.

Welton, "Room-temperature ionic liquids. Solvents for synthesis and catalysis", Chem Rev. 1999, 99:2071-2083.

He et al., "Self-Assembly of Block Copolymer Micelles in an Ionic Liquid", J. Am. Chem. Soc. 128 (2006) 2745-50.

* cited by examiner

IONIC POLYAMIDE AND POLYAMIDE-IMIDE MATERIALS AND METHODS OF USE

CROSS-REFERENCE TO RELATED APPLICATIONS

This application claims priority to U.S. Provisional Application Ser. No. 62/458,702, filed on Feb. 14, 2017, the disclosure of which is incorporated herein by reference in its entirety.

STATEMENT REGARDING FEDERALLY SPONSORED RESEARCH

This invention was made with government support under grant number CBET -1159397 awarded by the National Science Foundation. The government has certain rights in the invention.

FIELD

The subject matter disclosed herein generally relates to ionic polyamides or ionic polyamide-imides, methods for their synthesis, and uses of compositions of ionic polyamides or ionic polyamide-imides, e.g., in three-dimensional printing.

BACKGROUND

Although a great number of synthetic and natural polymers are commercially available and many new polymers are constantly reported in the scientific literature, only a very limited number of thermoplastic (i.e., "meltable") polymer materials are commercially available for 3-D printing. The most common thermoplastics used on consumer-level printers (e.g. Makerbot Replicator™) are typically acrylonitrile-butadiene-styrene (ABS) and poly(lactic acid) (PLA) which are useful only in low-demand applications, prototypes and models. Industrial/production-level printers, such as those marketed by Stratasys (parent company of Makerbot) offer 5 or 6 different types of thermoplastics including specialized formulations of ABS as well as more robust materials including polyamides (e.g. Nylon-12), polycarbonates and Ultem™, a polyetherimide (PEI). PEI are regarded as HP polymers, a group which also includes poly(arylamides) such as Kevlar™ and Nomex™, and fluoropolymers such as Teflon™. Nylon is considered a "mid-range" polymer along with ABS and polycarbonate.

Polyimides are among a small group ultra-high-performance (UHP) polymers based on their outstanding chemical, thermal and mechanical properties, placing them atop the "polymer performance pyramid". Kapton™ is perhaps the most well-known polyimide, and the use of Kapton film as thermal and electrical insulation is ubiquitous in electronic devices, including within 3-D printers. However, using Kapton as a material for 3-D printing is not possible as it does not melt, but degrades at about 400° C. Ultem™ possesses similar qualities to Kapton, but with a lower melting point, thus enabling its use within fused deposition modeling (FDM)-based 3-D printers.

There is a need for development efforts directed at discovering radically new thermoplastics which might expand the available types of mid-range, high-performance, and ultra-high-performance polymers which can be 3-D printed. High-temperature (>250° C.) 3-D printing via FDM is challenging from the standpoint of designing components for 3-D printers that withstand these temperatures.

What are needed are new thermoplastics for 3-D printing. The materials and methods disclosed herein address these and other needs.

SUMMARY

The present disclosure generally relates to ionic polyamides, ionic polyamide-imides, and methods for their synthesis. In some aspects, the disclosed synthetic methods can comprise a designable approach, which can allow for a greater degree of control of the structure of the ionic polyamides and ionic polyamide-imides.

In some aspects, the ionic polyamides can be represented by a structure according to the Formula (I):

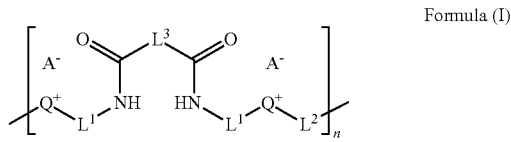

Formula (I)

wherein, $L^1$ is, independently for each occurrence, selected from the group consisting of a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

$L^2$ and $L^3$ are independently selected from the group consisting of a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

Q is an ionized heteroaryl, ionized heterocycloalkyl, or ionized heteroalkyl;

A is an anion; and n is an integer from 1 to 100,000.

In some aspects, the ionic polyamide-imides can be represented by a structure according to the Formula (II) or Formula (III):

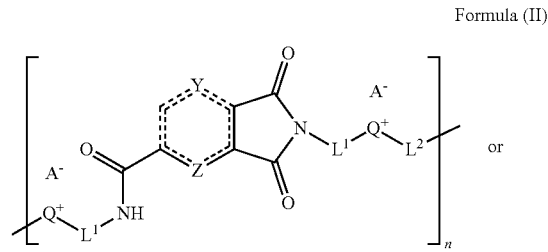

Formula (II)

or

-continued

Formula (III)

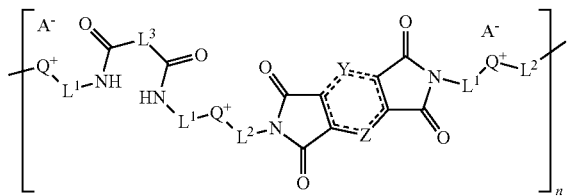

wherein,

L¹ is, independently for each occurrence, selected from the group consisting of a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

L² is selected from the group consisting of a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

Y is null, a bond, hydrogen, halogen, OH, CH, $CH_2$, C(O), O, S, $SO_2$, CN, N, NH, $NH_2$, substituted amine, hydroxyl, alkoxy, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Z is CH, $CH_2$, C(O), O, S, $SO_2$, N, NH, $NH_2$, CN, alkoxy, substituted amine, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is an ionized heteroaryl, ionized heterocycloalkyl, or ionized heteroalkyl;

A is an anion; and n is an integer from 1 to 100,000.

The ionic polyamides or polyamide-imides can further comprise an ionic liquid.

Articles comprising the ionic polyamides or polyamide-imides are also disclosed herein. The article can be a resin composition, a fiber, a fabric, a film, a tube, a sheet, a building material, a flooring material, or a composite material. In some examples, the article can be a three-dimensional printable resin composition.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions, as claimed.

DETAILED DESCRIPTION

Provided herein are ionic polyamides and ionic polyamide-imides. Methods for synthesizing the ionic polyamides and ionic polyamide-imides, which can be designable in structure and function, are also provided. Incorporating an ionic functionality can allow for a tunable structure, chemical properties, and physical properties of the resulting ionic polymer.

The materials, compounds, compositions, articles, and methods described herein can be understood more readily by reference to the following detailed description of specific aspects of the disclosed subject matter and the Examples and Figures included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an ionic liquid" includes mixtures of two or more such ionic liquids, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

A weight percent (wt. %) of a component, unless specifically stated to the contrary, is based on the total weight of the formulation or composition in which the component is included.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation acetylation, esterification, de-esterification, hydrolysis, etc.

The term "anion" is a type of ion and is included within the meaning of the term "ion." An "anion" is any molecule, portion of a molecule (e.g., zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. In specific examples, when a moiety is indicated as being substituted herein, it can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

"$R^1$," "$R^2$," and "$R^3$," are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkyl alcohol" is used in another, it is not meant to imply that the term "alkyl" does not also refer to specific terms such as "alkyl alcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkenyl" as used herein is a hydrocarbon group of from 2 to 24 carbon atoms with a structural formula containing at least one carbon-carbon double bond. Asymmetric structures such as $(R^1R^2)C=C(R^3R^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, triptycene, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl or heteroaryl group can be substituted or unsubstituted. The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" is a short hand notation for C=O.

The terms "amine" or "amino" as used herein are represented by the formula $NR^1R^2R^3$, where $R^1$, $R^2$, and $R^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH.

A "carboxylate" as used herein is represented by the formula —C(O)O⁻.

The term "ester" as used herein is represented by the formula —OC(O)$A^1$ or —C(O)O$A^1$, where $A^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $A^1OA^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $R^1C(O)R^2$, where $R^1$ and $R^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" as used herein refers to the halogens fluorine, chlorine, bromine, and iodine.

The term "hydroxyl" as used herein is represented by the formula —OH.

The term "nitro" as used herein is represented by the formula —$NO_2$.

The term "silyl" as used herein is represented by the formula —Si$R^1R^2R^3$, where $R^1$, $R^2$, and $R^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "anhydride" as used herein is represented by the formula —$R^1$—C(O)OC(O)—$R^2$, where $R^1$ and $R^2$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

As used herein, a bond represented by "----" can be present or absent.

As used herein, substantially pure means sufficiently homogeneous to appear free of readily detectable impurities as determined by standard methods of analysis, such as thin layer chromatography (TLC), nuclear magnetic resonance (NMR), gel electrophoresis, high performance liquid chromatography (HPLC) and mass spectrometry (MS), gas-chromatography mass spectrometry (GC-MS), and similar, used by those of skill in the art to assess such purity, or sufficiently pure such that further purification would not detectably alter the physical and chemical properties, such as enzymatic and biological activities, of the subs Materials and Compositions The ionic polyamides and ionic polyamide-imides disclosed herein present new materials that can be used to address market opportunities in 3-D printing. The ionic polyamides and ionic polyamide-imides can be formed using well-known condensation principles and accepted statistical models (i.e., Carothers' Equations) which allow for predictably achieving targeted polymer molecular weight parameters (MN, MW and PDI) which influence melting temperature (Tm) and melt viscosity—operating parameters for FDM-based 3-D printers are known. In some embodiments, the ionic polyamides and ionic polyamide-imides can have a molecular weight of 1,000,000 Daltons or less. For example, the ionic polyamides and ionic polyamide-imides can have a molecular weight of 750,000 Daltons or less, 500,000 Daltons or less, 400,000 Daltons or less, 300,000 Daltons or less, 200,000 Daltons or less, 100,000 Daltons or less, 75,000 Daltons or less, 50,000 Daltons or less, or 25,000 Daltons or less. In some embodiments, the ionic polyamides and ionic polyamide-imides can have a molecular weight of from 1,000 to 500,000 Da, from 10,000 to 500,000 Da, from 10,000 to 400,000 Da, from 10,000 to 350,000 Da, or from 50,000 to 300,000 Da.

Ionic Polyamides

The ionic polyamides are polymers comprising repeating amide monomers. In specific aspects, disclosed herein are ionic polyamides and compositions thereof. In some examples the ionic polyamides can be represented by Formula I:

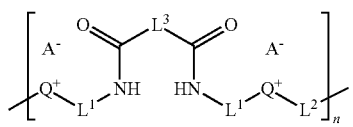

Formula (I)

wherein, $L^1$ is, independently for each occurrence, selected from the group consisting of a bond, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol groups, and combinations thereof;

$L^2$ is selected from the group consisting of a bond, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol groups, and combinations thereof;

$L^3$ is selected from the group consisting of substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol groups, and combinations thereof;

Q is an ionized heteroaryl, ionized heterocycloalkyl, or ionized heteroalkyl;

A is an anion; and n is an integer from 1 to 100,000.

In some aspects of Formula (I), $L^1$ is, independently for each occurrence, selected from the group consisting of a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

$L^2$ and $L^3$ are independently selected from the group consisting of a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

Q is an ionized heteroaryl, ionized heterocycloalkyl, or ionized heteroalkyl;

A is an anion; and n is an integer from 1 to 100,000.

In some examples of Formula (I), $L^1$ can be a bond, a $C_{1-20}$ alkyl, a $C_{2-20}$ alkenyl, a $C_{1-20}$ heteroalkyl, a substituted or unsubstituted cycloalkyl, a substituted or unsubstituted aryl, a substituted or unsubstituted heteroaryl, or combinations thereof. For example, $L^1$ can be a bond, a $C_{1-12}$ alkyl, a $C_{2-12}$ alkenyl, a $C_{2-12}$ heteroalkyl, a cycloalkyl, or a substituted or unsubstituted aryl. In specific examples of Formula (I), $L^1$ can be a branched or unbranched $C_{1-12}$ alkyl or a substituted or unsubstituted aryl. In some embodiments, each occurrence of $L^1$ is the same. In some embodiments, each occurrence of $L^1$ is different.

In some specific examples, $L^1$ can be a polyether, polyester, or polyamide of from 1-100 atoms in length.

In some examples of Formula (I), $L^2$ and $L^3$, independent of the other, can be a $C_{1-20}$ alkyl, a $C_{2-20}$ alkenyl, a $C_{2-20}$ alkynyl, a $C_{1-20}$ heteroalkyl, a $C_{2-20}$ heteroalkenyl, a $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof. For example, $L^2$ and $L^3$, independent of the other, can be a $C_{1-12}$ alkyl, a $C_{2-12}$ alkenyl, a $C_{2-12}$ alkynyl, a $C_{1-12}$ heteroalkyl, a $C_{2-12}$ heteroalkenyl, a $C_{2-12}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof. In specific examples of Formula (I), $L^2$ can be a branched or unbranched $C_{1-12}$ alkyl, a substituted or unsubstituted aryl or a substituted or unsubstituted heteroaryl. In further specific examples of Formula (I), $L^3$ can be a substituted or unsubstituted cycloalkyl, substituted or unsubstituted heterocycloalkyl, substituted or unsubstituted aryl, or a substituted or unsubstituted heteroaryl. For example, $L^3$ can be a substituted or unsubstituted $C_{1-12}$ alkyl.

In some examples of Formula (I), Q can be an ionized heteroaryl such as substituted or unsubstituted pyrazolium, substituted or unsubstituted pyridinium, substituted or unsubstituted pyrazinium, substituted or unsubstituted pyrimidinium, substituted or unsubstituted pyridazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, or substituted or unsubstituted morpholininium. For example, Q can be imidazolium.

In other examples of Formula (I), Q can be an ionized heteroalkyl such as a substituted or unsubstituted ammonium or a substituted or unsubstituted phosphonium.

In specific examples of Formula (I), Q can be substituted with a functional group selected from alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol, or combinations thereof.

In some examples of Formula (I), A can be chloride, bromide, iodide, nitrate, dicyanamide, acetate, bis(trifluoromethane)sulfonimide, hexafluorophosphate, tetrafluoroborate, sulfate, phosphate, tris(perfluoroalkyl)trifluorophosphatemesylate, aluminum chloride, thiocyanide, mesylate, triflate, or tosylate.

In some examples of Formula (I), n can be an integer from 10 to 5,000. For example, n can be an integer from 10 to 4,000, from 10 to 3,000, from 10 to 2,000, from 10 to 1,000, from 10 to 500, from 100 to 2,000, or from 100 to 1,000.

In some embodiments, the ionic polyamides of Formula (I) can be represented by Formula I-A or I-B:

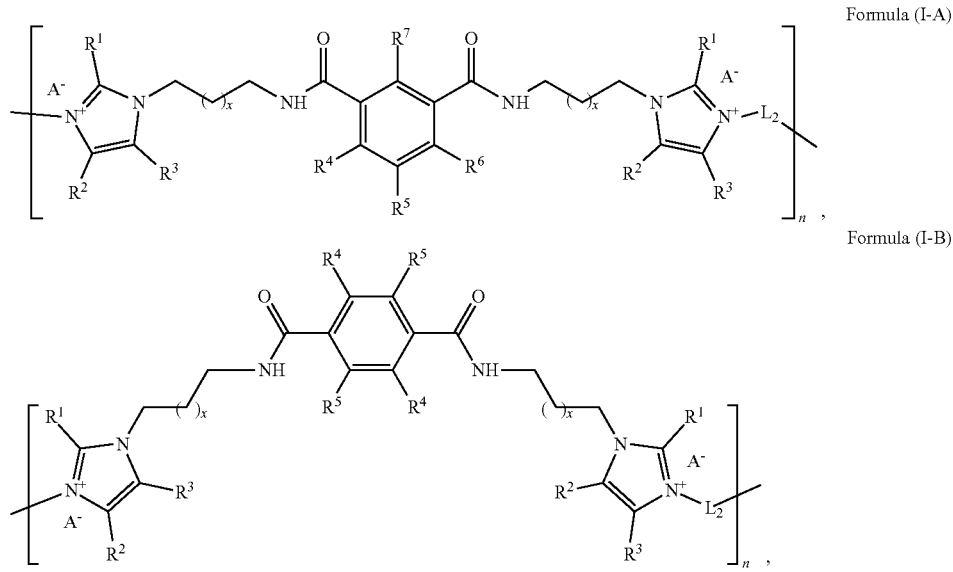

Formula (I-A)

Formula (I-B)

wherein $L_2$ is a bond, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$R^1$, $R^2$, $R^3$, $R^4$, $R^5$, and $R^6$ are, independent of the other, hydrogen, halogen, hydroxyl, nitrile, alkyl halide, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

n is an integer from 1 to 100,000; and x is an integer from 0 to 20.

In some examples of Formulas I-A and I-B, $L_2$ is a bond, substituted or unsubstituted $C_{1-6}$ alkyl, substituted or unsubstituted $C_{2-6}$ alkenyl, substituted or unsubstituted $C_{2-6}$ alkynyl, substituted or unsubstituted $C_{1-20}$ heteroalkyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkyl halide, alkoxyl, aldehyde, amino, carboxylic acid, ester, ether, hydroxy, or nitrile groups.

In some examples of Formulas I-A and I-B, $R^1$, $R^2$, $R^3$, $R^4$, $R^5$, and $R^6$ are, independent of the other, hydrogen, substituted or unsubstituted $C_{1-6}$ alkyl, substituted or unsubstituted $C_{2-6}$ alkenyl, halogen, hydroxyl, nitrile, or alkyl halide.

In some examples of Formulas I-A and I-B, n is an integer from 1 to 50,000, from 1 to 20,000, from 1 to 10,000, or from 1 to 5,000.

In some examples of Formulas I-A and I-B, x is 0, 1, 2, 3, 4, 5, 6, 7, 8, 9, or 10. In specific examples, the ionic polyamides of Formula (I) can be represented by Formula I-C or Formula I-D:

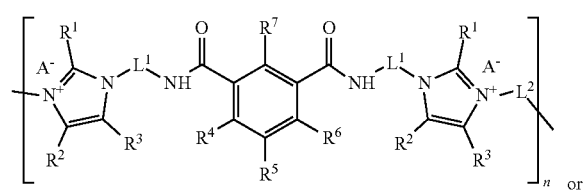

Formula I-C

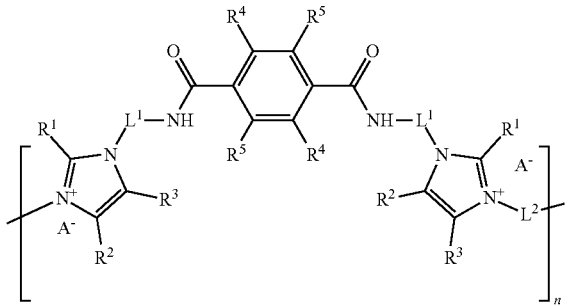

Formula I-D wherein $L^1$ is, independently for each occurrence, selected from the group consisting of a substituted or unsubstituted cycloalkyl, a substituted or unsubstituted heterocycloalkyl, a substituted or unsubstituted aryl, and a substituted or unsubstituted heteroaryl;

$L^2$ is selected from the group consisting of a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof; and n is an integer from 1 to 100,000.

In some examples of Formulas I-C and I-D, $L^1$ is, independently for each occurrence, selected from the group consisting of a substituted or unsubstituted aryl and a substituted or unsubstituted heteroaryl. In some examples $L^1$ is the same for each occurrence. In some examples, $L^1$ is the different for each occurrence. In some examples, $L^1$ is a substituted or unsubstituted aryl.

In some examples of Formulas I-C and I-D, $L_2$ is a bond, substituted or unsubstituted $C_{1-6}$ alkyl, substituted or unsubstituted $C_{2-6}$ alkenyl, substituted or unsubstituted $C_{2-6}$ alkynyl, substituted or unsubstituted $C_{1-20}$ heteroalkyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkyl halide, alkoxyl, aldehyde, amino, carboxylic acid, ester, ether, hydroxy, or nitrile groups.

In some examples of Formulas I-C and I-D, n is an integer from 1 to 50,000, from 1 to 20,000, from 1 to 10,000, or from 1 to 5,000.

In specific examples, the ionic polyamides of Formulas I-C and I-D can be represented by Formula I-C-1 or Formula I-D-1:

Formula I-C-1

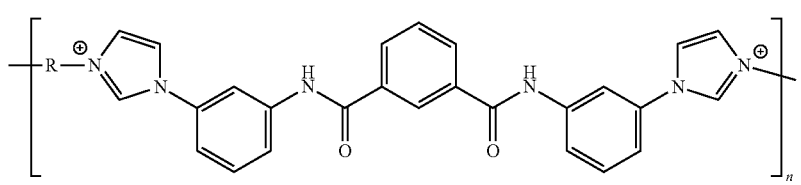

or

Formula I-D-1

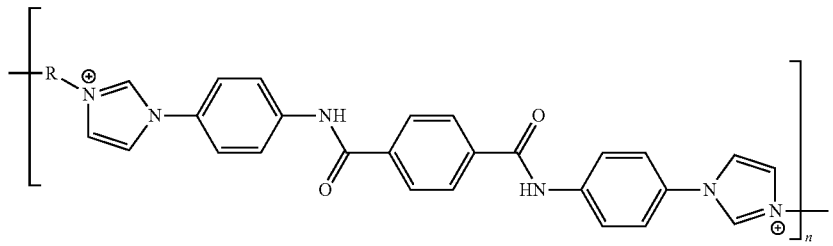

wherein

R is a bond, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and n is an integer from 1 to 100,000.

Ionic Polyamide-Imides

The ionic polyamide-imides disclosed herein are polymers comprising repeating amide and imide monomers. In specific aspects, disclosed herein are ionic polyamide-imides and compositions thereof. The ionic polyamide-imides disclosed herein can be divided into subclasses of compounds based on the repeating units in the polymer.

One subclass of the ionic polyamide-imides can be represented by Formula (II):

Formula (II)

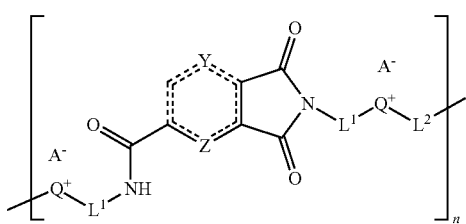

wherein, $L^1$ is, independently for each occurrence, a bond, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol groups, and combinations thereof;

$L^2$ is a bond, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol groups, and combinations thereof;

Y is null, a bond, hydrogen, halogen, OH, CH, $CH_2$, C(O), O, S, $SO_2$, CN, N, NH, $NH_2$, substituted amine, hydroxyl, alkoxy, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Z is CH, $CH_2$, C(O), O, S, $SO_2$, N, NH, $NH_2$, CN, alkoxy, substituted amine, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is an ionized heteroaryl, ionized heterocycloalkyl, or ionized heteroalkyl;

A is an anion; and n is an integer from 1 to 100,000.

In some embodiments of Formula (II), $L^1$ is, independently for each occurrence, a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof;

$L^2$ is a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof;

Y and Z are, independent of the other, a bond, hydrogen, halogen, hydroxyl, carbonyl, O, S, $SO_2$, cyano, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or C(X) wherein X is selected from a hydrogen, halogen, hydroxyl, alkyl, or haloalkyl;

Q is an ionized heteroaryl, ionized heterocycloalkyl, or ionized heteroalkyl;

A is an anion; and n is an integer from 1 to 100,000.

In some examples of Formula (II), $L^1$ can be a bond, a $C_{1-20}$ alkyl, a $C_{2-20}$ alkenyl, a $C_{1-20}$ heteroalkyl, a substituted or unsubstituted cycloalkyl, a substituted or unsubstituted aryl, a substituted or unsubstituted heteroaryl, or combinations thereof; and $L^2$ can be a $C_{1-20}$ alkyl, a $C_{2-20}$ alkenyl, a $C_{2-20}$ alkynyl, a $C_{1-20}$ heteroalkyl, a $C_{2-20}$ heteroalkenyl, a $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof. For example, $L^1$ can be a bond, a $C_{1-12}$ alkyl, a $C_{2-12}$ alkenyl, a $C_{2-12}$ heteroalkyl, a cycloalkyl, or a substituted or unsubstituted aryl; and $L^2$ can be a $C_{1-12}$ alkyl, a $C_{2-12}$ alkenyl, a $C_{2-12}$ alkynyl, a $C_{1-12}$ heteroalkyl, a $C_{2-12}$ heteroalkenyl, a $C_{2-12}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof. In some embodiments, each occurrence of $L^1$ is the same. In some embodiments, each occurrence of $L^1$ is different.

In some specific examples, $L^1$ can be a polyether, polyester, or polyamide of from 1-100 atoms in length.

In specific examples of Formula (II), $L^1$ can be a branched or unbranched $C_{1-12}$ alkyl or a substituted or unsubstituted aryl.

In some examples of Formula II, $L^1$ is, independently for each occurrence, selected from the group consisting of a substituted or unsubstituted aryl and a substituted or unsubstituted heteroaryl. In some examples $L^1$ is the same for each occurrence. In some examples, $L^1$ is the different for each occurrence. In some examples, $L^1$ is a substituted or unsubstituted aryl.

In some examples of Formula II, $L_2$ is a bond, substituted or unsubstituted $C_{1-6}$ alkyl, substituted or unsubstituted $C_{2-6}$ alkenyl, substituted or unsubstituted $C_{2-6}$ alkynyl, substituted or unsubstituted $C_{1-20}$ heteroalkyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkyl halide, alkoxyl, aldehyde, amino, carboxylic acid, ester, ether, hydroxy, or nitrile groups. In specific examples of Formula (II), $L^2$ can be a branched or unbranched $C_{1-12}$ alkyl, a substituted or unsubstituted aryl or a substituted or unsubstituted heteroaryl.

In some examples of Formula (II), Y and Z can be C(X), wherein X is hydrogen, halogen, hydroxyl, alkyl, or haloalkyl. For example, Y and Z can be C(X), wherein X is hydrogen, halogen, or $CF_3$.

In some examples of Formula (II), Q can be an ionized heteroaryl selected from the group consisting of substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, or substituted or unsubstituted morpholininium. For example, Q can be imidazolium.

In other examples of Formula (II), Q can be an ionized heteroalkyl comprising a substituted or unsubstituted ammonium or a substituted or unsubstituted phosphonium.

In specific examples of Formula (II), Q can be substituted with a functional group selected from alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol, or combinations thereof.

In some examples of Formula (II), A can be selected from chloride, bromide, iodide, nitrate, dicyanamide, acetate, bis(trifluoromethane)sulfonimide, hexafluorophosphate, tetrafluoroborate, sulfate, phosphate, tris(perfluoroalkyl)trifluorophosphatemesylate, aluminum chloride, thiocyanide, mesylate, triflate, or tosylate.

In some examples of Formula (II), n can be an integer from 10 to 5,000. For example, n can be an integer from 10 to 4,000, from 10 to 3,000, from 10 to 2,000, from 10 to 1,000, from 10 to 500, from 100 to 2,000, or from 100 to 1,000.

In some examples, the ionic polyamide-imides of Formula (II) can be represented by Formula II-A:

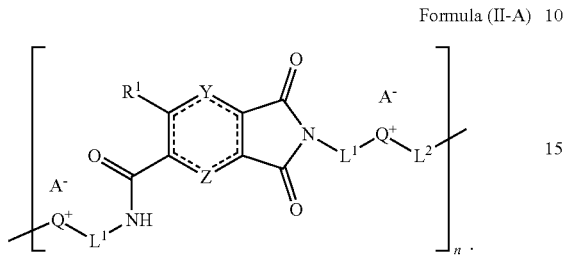

Formula (II-A)

In some examples of Formula (II-A), $L^1$ is, independently for each occurrence, selected from the group consisting of a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

$L^2$ is selected from the group consisting of a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

Y and Z, are independent of each other, selected from the group consisting of a bond, hydrogen, halogen, hydroxyl, carbonyl, O, S, $SO_2$, cyano, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, and C(X) wherein X is selected from a hydrogen, halogen, hydroxyl, alkyl, or haloalkyl;

$R^1$ is hydrogen, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is an ionized heteroaryl, ionized heterocycloalkyl, or ionized heteroalkyl;

A is an anion; and n is an integer from 1 to 100,000.

In some examples of Formula II-A, $L^1$ is, independently for each occurrence, selected from the group consisting of a substituted or unsubstituted aryl and a substituted or unsubstituted heteroaryl. In some examples $L^1$ is the same for each occurrence. In some examples, $L^1$ is the different for each occurrence. In some examples, $L^1$ is a substituted or unsubstituted aryl.

In some examples of Formula II-A, $L_2$ is a bond, substituted or unsubstituted $C_{1-6}$ alkyl, substituted or unsubstituted $C_{2-6}$ alkenyl, substituted or unsubstituted $C_{2-6}$ alkynyl, substituted or unsubstituted $C_{1-20}$ heteroalkyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkyl halide, alkoxyl, aldehyde, amino, carboxylic acid, ester, ether, hydroxy, or nitrile groups.

For example, ionic polyamide-imides of Formula (II) can be represented by Formula II-A-1:

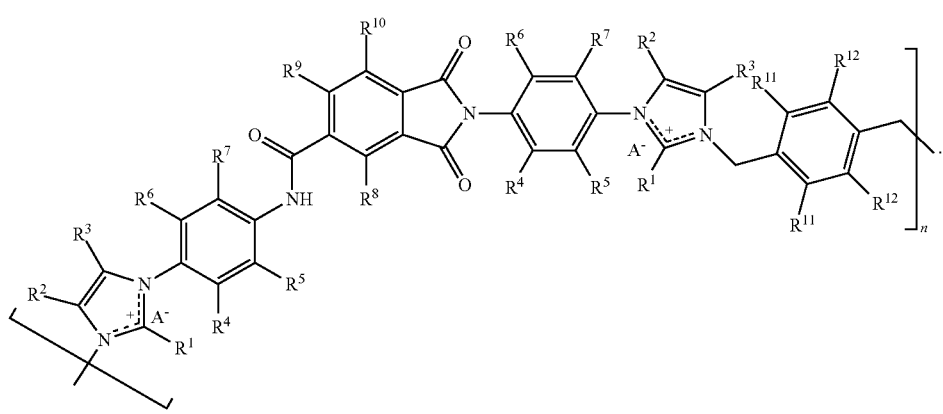

Formula (II-A-1)

In some examples of Formula (II-A-1), $R^1$, $R^2$, $R^3$, $R^4$, $R^5$, $R^6$, $R^7$, $R^8$, $R^9$, $R^{10}$, $R^{11}$ and $R^{12}$ are, independent of any other, hydrogen, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

A is chloride, bromide, iodide, nitrate, dicyanamide, acetate, bis(trifluoromethane)sulfonamide, hexafluorophosphate, tetrafluoroborate, sulfate, phosphate, tris(perfluoroalkyl) trifluorophosphatemesylate, aluminum chloride, thiocyanide, mesylate, triflate, or tosylate, and n is an integer from 1 to 100,000.

In some examples, ionic polyamide-imides of Formula (II) can be represented by Formula II-A-2:

eroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$L^2$ is C(O), O, S, SO$_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, het- Formula (II-A-2)

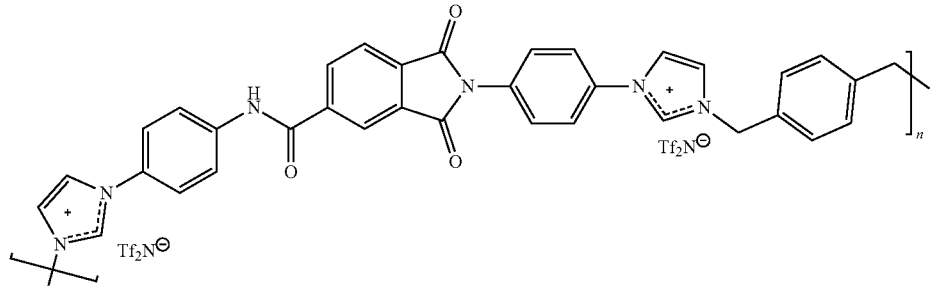

Another subclass of ionic polyamide-imides disclosed herein can be represented by Formula III:

Formula (III)

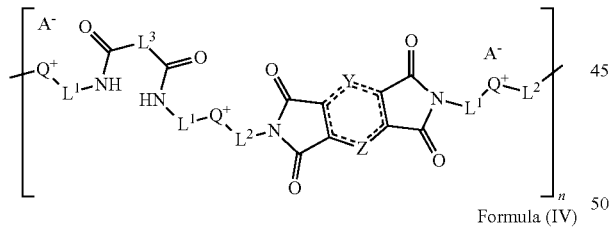

Formula (IV)

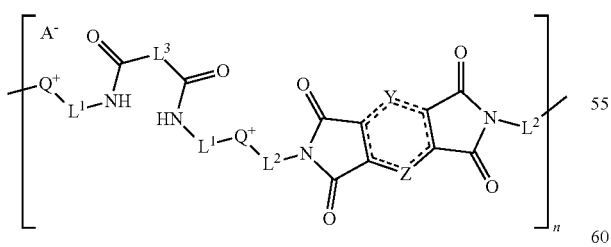

wherein, $L^1$ is, independently for each occurrence, a bond, CH$_2$, C(O), O, S, SO$_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroaryl, aldehyde, amino, carboxylic acid, ester, ether, halide, hydroxy, ketone, nitro, silyl, sulfo-oxo, sulfonyl, sulfone, sulfoxide, or thiol groups;

Y is null, a bond, hydrogen, halogen, OH, CH, CH$_2$, C(O), O, S, SO$_2$, CN, N, NH, NH$_2$, substituted amine, hydroxyl, alkoxy, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Z is CH, CH$_2$, C(O), O, S, SO$_2$, N, NH, NH$_2$, CN, alkoxy, substituted amine, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is an ionized heteroaryl, ionized heterocycloalkyl, or ionized heteroalkyl;

A is an anion; and n is an integer from 1 to 100,000.

In some examples of Formula (III) and (IV), $L^1$ is, independently for each occurrence, a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof;

$L^2$ and $L^3$ are independently, for each occurrence, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof;

Y and Z are, independent of any other, a bond, hydrogen, halogen, hydroxyl, carbonyl, O, S, $SO_2$, cyano, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, and C(X) wherein X is selected from a hydrogen, halogen, hydroxyl, alkyl, or haloalkyl;

Q is an ionized heteroaryl, ionized heterocycloalkyl, or ionized heteroalkyl;

A is an anion; and n is an integer from 1 to 100,000.

In some examples of Formula (III) and (IV), $L^1$ can be a bond, a $C_{1-20}$ alkyl, a $C_{2-20}$ alkenyl, a $C_{1-20}$ heteroalkyl, a substituted or unsubstituted cycloalkyl, a substituted or unsubstituted aryl, a substituted or unsubstituted heteroaryl, or combinations thereof; and $L^2$ can be a $C_{1-20}$ alkyl, a $C_{2-20}$ alkenyl, a $C_{2-20}$ alkynyl, a $C_{1-20}$ heteroalkyl, a $C_{2-20}$ heteroalkenyl, a $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof. For example, $L^1$ can be a bond, a $C_{1-12}$ alkyl, a $C_{2-12}$ alkenyl, a $C_{2-12}$ heteroalkyl, a cycloalkyl, or a substituted or unsubstituted aryl; and $L^2$ can be a $C_{1-12}$ alkyl, a $C_{2-12}$ alkenyl, a $C_{2-12}$ alkynyl, a $C_{1-12}$ heteroalkyl, a $C_{2-12}$ heteroalkenyl, a $C_{2-12}$ heteroalkynyl, a substituted or unsubstituted cycloalkyl, a substituted or unsubstituted heterocycloalkyl, a substituted or unsubstituted aryl, or a substituted or unsubstituted heteroaryl, or combinations thereof. In some embodiments, each occurrence of $L^1$ is the same. In some embodiments, each occurrence of $L^1$ is different.

In some specific examples, $L^1$ can be a polyether, polyester, or polyamide of from 1-100 atoms in length.

In specific examples of Formula (III) and (IV), $L^1$ can be a branched or unbranched $C_{1-12}$ alkyl or a substituted or unsubstituted aryl.

In specific examples of Formula (III) and (IV), $L^2$ can be a branched or unbranched $C_{1-12}$ alkyl, a substituted or unsubstituted aryl or a substituted or unsubstituted heteroaryl.

Q is an ionized heteroaryl, ionized heterocycloalkyl, or ionized heteroalkyl;

A is an anion; and n is an integer from 1 to 100,000.

In some examples of Formula (III) and (IV), $L^3$ can be a $C_{1-20}$ alkyl, a $C_{2-20}$ alkenyl, a $C_{2-20}$ alkynyl, a $C_{1-20}$ heteroalkyl, a $C_{2-20}$ heteroalkenyl, a $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof. For example, $L^3$ can be a $C_{1-12}$ alkyl, a $C_{2-12}$ alkenyl, a $C_{2-12}$ alkynyl, a $C_{1-12}$ heteroalkyl, a $C_{2-12}$ heteroalkenyl, a $C_{2-12}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof. In specific examples, $L^3$ can be a substituted or unsubstituted cycloalkyl, substituted or unsubstituted heterocycloalkyl, substituted or unsubstituted aryl, or a substituted or unsubstituted heteroaryl.

In some examples of Formula (III) and (IV), Y and Z can be C(X), wherein X is hydrogen, halogen, hydroxyl, alkyl, or haloalkyl. For example, Y and Z can be C(X), wherein X is hydrogen, halogen, or $CF_3$.

In specific examples of Formula (III) and (IV), Q can be an ionized heteroaryl selected from the group consisting of substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, or substituted or unsubstituted morpholininium. For example, Q can be imidazolium.

In other examples of Formula (III) and (IV), Q can be an ionized heteroalkyl comprising a substituted or unsubstituted ammonium or a substituted or unsubstituted phosphonium.

In specific examples of Formula (III) and (IV), Q can be substituted with a functional group selected from alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol, or combinations thereof.

In some examples of Formula (III) and (IV), A can be selected from chloride, bromide, iodide, nitrate, dicyanamide, acetate, bis(trifluoromethane)sulfonimide, hexafluorophosphate, tetrafluoroborate, sulfate, phosphate, tris(perfluoroalkyl)trifluorophosphatemesylate, aluminum chloride, thiocyanide, mesylate, triflate, or tosylate.

In some examples of Formula (III) and (IV), n can be an integer from 10 to 5,000. For example, n can be an integer from 10 to 4,000, from 10 to 3,000, from 10 to 2,000, from 10 to 1,000, from 10 to 500, from 100 to 2,000, or from 100 to 1,000.

In some examples, the ionic polyamide-imides of Formula (III) can be represented by Formula III-A:

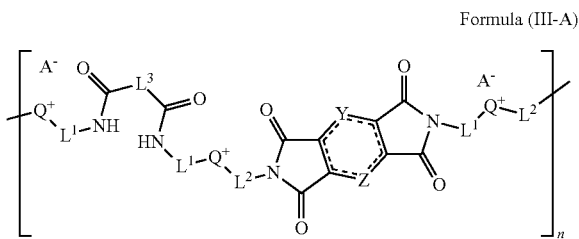

Formula (III-A)

wherein,
$L^1$ is, independently for each occurrence, a bond, C(O), O, S, SO$_2$, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$L^2$ and $L^3$ are independently, for each occurrence, C(O), O, S, SO$_2$, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Y and Z, are independent of each other, is CH, CH$_2$, C(O), O, S, SO$_2$, CN, N, NH, NH$_2$, substituted amine, substituted amide, alkoxy, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is an ionized heteroaryl, ionized heterocycloalkyl, or ionized heteroalkyl;

A is an anion; and n is an integer from 1 to 100,000.

In some examples of Formula (III-A),
$L^1$ is, independently for each occurrence, a bond, a substituted or unsubstituted C$_{1-20}$ alkyl, a substituted or unsubstituted C$_{2-20}$ alkenyl, a substituted or unsubstituted C$_{2-20}$ alkynyl, a substituted or unsubstituted C$_{1-20}$ heteroalkyl, a substituted or unsubstituted C$_{2-20}$ heteroalkenyl, a substituted or unsubstituted C$_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof;

$L^2$ is a substituted or unsubstituted C$_{1-20}$ alkyl, a substituted or unsubstituted C$_{2-20}$ alkenyl, a substituted or unsubstituted C$_{2-20}$ alkynyl, a substituted or unsubstituted C$_{1-20}$ heteroalkyl, a substituted or unsubstituted C$_{2-20}$ heteroalkenyl, a substituted or unsubstituted C$_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof;

$L^3$ is selected from the group consisting of a substituted or unsubstituted C$_{1-20}$ alkyl, a substituted or unsubstituted cycloalkyl, a substituted or unsubstituted heterocycloalkyl, a substituted or unsubstituted aryl, and a substituted or unsubstituted heteroaryl;

Y and Z are, independent of any other, a bond, hydrogen, halogen, hydroxyl, carbonyl, O, S, SO$_2$, cyano, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, or C(X) wherein X is selected from a hydrogen, halogen, hydroxyl, alkyl, or haloalkyl;

Q is an ionized heteroaryl, ionized heterocycloalkyl, or ionized heteroalkyl;

A is an anion; and n is an integer from 1 to 100,000.

In some examples of Formula (III-A), $L^1$ can be a bond, a C$_{1-20}$ alkyl, a C$_{2-20}$ alkenyl, a C$_{1-20}$ heteroalkyl, a substituted or unsubstituted cycloalkyl, a substituted or unsubstituted aryl, a substituted or unsubstituted heteroaryl, or combinations thereof; and $L^2$ can be a C$_{1-20}$ alkyl, a C$_{2-20}$ alkenyl, a C$_{2-20}$ alkynyl, a C$_{1-20}$ heteroalkyl, a C$_{2-20}$ heteroalkenyl, a C$_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof. For example, $L^1$ can be a bond, a C$_{1-12}$ alkyl, a C$_{2-12}$ alkenyl, a C$_{2-12}$ heteroalkyl, a cycloalkyl, or a substituted or unsubstituted aryl; and $L^2$ can be a C$_{1-12}$ alkyl, a C$_{2-12}$ alkenyl, a C$_{2-12}$ alkynyl, a C$_{1-12}$ heteroalkyl, a C$_{2-12}$ heteroalkenyl, a C$_{2-12}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof.

In specific examples of Formula (III-A), $L^1$ can be a branched or unbranched $C_{1-12}$ alkyl or a substituted or unsubstituted aryl.

In specific examples of Formula (III-A), $L^2$ can be a branched or unbranched $C_{1-12}$ alkyl, a substituted or unsubstituted aryl or a substituted or unsubstituted heteroaryl.

In some examples of Formula (III-A), Y and Z can be C(X), wherein X is hydrogen, halogen, hydroxyl, alkyl, or haloalkyl. For example, Y and Z can be C(X), wherein X is hydrogen, halogen, $CF_3$.

In specific examples of Formula (III-A), Q can be an ionized heteroaryl selected from the group consisting of substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, or substituted or unsubstituted morpholininium. For example, Q can be imidazolium.

In other examples of Formula (III-A), Q can be an ionized heteroalkyl comprising a substituted or unsubstituted ammonium or a substituted or unsubstituted phosphonium.

In specific examples of Formula (III-A), Q can be substituted with a functional group selected from alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol, or combinations thereof.

In some examples of Formula (III-A), A can be selected from chloride, bromide, iodide, nitrate, dicyanamide, acetate, bis(trifluoromethane)sulfonimide, hexafluorophosphate, tetrafluoroborate, sulfate, phosphate, tris(perfluoroalkyl)trifluorophosphatemesylate, aluminum chloride, thiocyanide, mesylate, triflate, or tosylate.

In some examples of Formula (III-A), n can be an integer from 10 to 5,000. For example, n can be an integer from 10 to 4,000, from 10 to 3,000, from 10 to 2,000, from 10 to 1,000, from 10 to 500, from 100 to 2,000, or from 100 to 1,000.

In some examples, the ionic polyamide-imides of Formula (IV) can be represented by Formula IV-A:

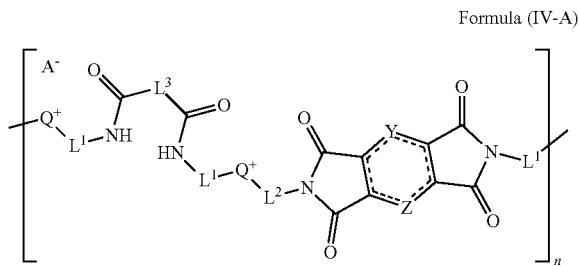

Formula (IV-A)

wherein, $L^1$ is, independently for each occurrence, a bond, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$L^2$ and $L^3$ are independently, for each occurrence, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Y and Z, are independent of each other, is CH, $CH_2$, C(O), O, S, $SO_2$, CN, N, NH, $NH_2$, substituted amine, substituted amide, alkoxy, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is an ionized heteroaryl, ionized heterocycloalkyl, or ionized heteroalkyl;

A is an anion; and n is an integer from 1 to 100,000.

In some examples of Formula (IV-A), $L^1$ is, independently for each occurrence, a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof;

$L^2$ is a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof;

$L^3$ is selected from the group consisting of a substituted or unsubstituted $C_{1-20}$ alkyl, a substituted or unsubstituted cycloalkyl, a substituted or unsubstituted heterocycloalkyl, a substituted or unsubstituted aryl, and a substituted or unsubstituted heteroaryl;

Y and Z are, independent of any other, a bond, hydrogen, halogen, hydroxyl, carbonyl, O, S, $SO_2$, cyano, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or C(X) wherein X is selected from a hydrogen, halogen, hydroxyl, alkyl, or haloalkyl;

Q is an ionized heteroaryl, ionized heterocycloalkyl, or ionized heteroalkyl;

A is an anion; and n is an integer from 1 to 100,000.

In some examples of Formula (IV-A), $L^1$ can be a bond, a $C_{1-20}$ alkyl, a $C_{2-20}$ alkenyl, a $C_{1-20}$ heteroalkyl, a substituted or unsubstituted cycloalkyl, a substituted or unsubstituted aryl, a substituted or unsubstituted heteroaryl, or combinations thereof; and $L^2$ can be a $C_{1-20}$ alkyl, a $C_{2-20}$ alkenyl, a $C_{2-20}$ alkynyl, a $C_{1-20}$ heteroalkyl, a $C_{2-20}$ heteroalkenyl, a $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof. For example, $L^1$ can be a bond, a $C_{1-12}$ alkyl, a $C_{2-12}$ alkenyl, a $C_{2-12}$ heteroalkyl, a cycloalkyl, or a substituted or unsubstituted aryl; and $L^2$ can be a $C_{1-12}$ alkyl, a $C_{2-12}$ alkenyl, a $C_{2-12}$ alkynyl, a $C_{1-12}$ heteroalkyl, a $C_{2-12}$ heteroalkenyl, a $C_{2-12}$ heteroalkynyl, a substituted or unsubstituted cycloalkyl, a substituted or unsubstituted heterocycloalkyl, a substituted or unsubstituted aryl, a substituted or unsubstituted heteroaryl, or combinations thereof.

In some examples of Formula IV-A, $L^1$ is, independently for each occurrence, selected from the group consisting of a substituted or unsubstituted aryl and a substituted or unsubstituted heteroaryl. In some examples $L^1$ is the same for each occurrence. In some examples, $L^1$ is the different for each occurrence. In some examples, $L^1$ is a substituted or unsubstituted aryl.

In specific examples of Formula (IV-A), $L^1$ can be a branched or unbranched $C_{1-12}$ alkyl or a substituted or unsubstituted aryl.

In specific examples of Formula (IV-A), $L^2$ can be a branched or linear $C_{1-12}$ alkyl, a substituted or unsubstituted aryl or a substituted or unsubstituted heteroaryl.

In some examples of Formula IV-A, $L^3$ is selected from the group consisting of a substituted or unsubstituted aryl and a substituted or unsubstituted heteroaryl. In some examples, $L^3$ is a substituted or unsubstituted aryl.

In some examples of Formula (IV-A), Y and Z can be C(X), wherein X is hydrogen, halogen, hydroxyl, alkyl, or haloalkyl. For example, Y and Z can be C(X), wherein X is hydrogen, halogen, $CF_3$.

In specific examples of Formula (IV-A), Q can be an ionized heteroaryl selected from the group consisting of substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, or substituted or unsubstituted morpholininium. For example, Q can be imidazolium.

In other examples of Formula (IV-A), Q can be an ionized heteroalkyl comprising a substituted or unsubstituted ammonium or a substituted or unsubstituted phosphonium.

In specific examples of Formula (IV-A), Q can be substituted with a functional group selected from alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, thiol, or combinations thereof.

In some examples of Formula (IV-A), A can be selected from chloride, bromide, iodide, nitrate, dicyanamide, acetate, bis(trifluoromethane)sulfonimide, hexafluorophosphate, tetrafluoroborate, sulfate, phosphate, tris(perfluoroalkyl)trifluorophosphatemesylate, aluminum chloride, thiocyanide, mesylate, triflate, or tosylate.

In some examples of Formula (IV-A), n can be an integer from 10 to 5,000. For example, n can be an integer from 10 to 4,000, from 10 to 3,000, from 10 to 2,000, from 10 to 1,000, from 10 to 500, from 100 to 2,000, or from 100 to 1,000.

For example, ionic polyamide-imides of Formula (IV) can be represented by Formula IV-A-1:

Formula (IV-A-1)

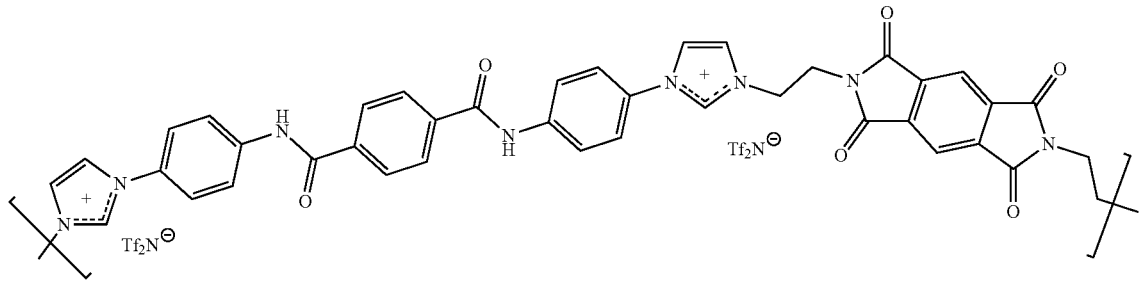

wherein n is an integer from 1 to 100,000.

Synthesis of an Ionic Polyamides and Ionic Polyamide-Imides

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), Sigma (St. Louis, Mo.), or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989). Other materials, such as the ligands, disclosed herein can be obtained from commercial sources.

Ionic Polyamides

Also disclosed herein are methods for synthesizing an ionic polyamide comprising an ionized heteroaryl. The methods disclosed herein can comprise at least four components: (1) a diacid, (2) an amine tethered to an ionizable heteroaryl, (3) an alkylating agent, and (4) an anion. In some aspects, the disclosed methods can generate an ionic polyamide by reacting the diacid with the amine tethered to an ionizable heteroaryl to generate a bridging monomer. (See Scheme 1.) The bridging monomer can be reacted with an alkylating reagent to generate a repeating pattern. The anion can be optionally exchanged.

Diacid

A diacid can be utilized to generate the ionic polyamide. A diacid molecule comprises two acid functional groups. The molecular structure between the two acid functional groups can be altered to adjust the resulting ionic polyamide's properties, such as thermal stability, chemical reactivity, viscosity, and melting point, among other chemical and physical properties. For example, incorporating an aryl functional group into the diacid molecule can lead to greater thermal stability based on the stacking of the pi systems as a polymer.

In some embodiments, the diacid can be a diacid halide such as a diacid chloride. Some suitable examples of diacid halides that can be used herein include, but are not limited to, terephthaloyl chloride, oxalyl chloride, malonyl chloride, succinyl chloride, glutaryl chloride, adipoyl chloride, pimeloyl chloride, suberoyl chloride, azelaoyl chloride, sebacoyl chloride, isophthaloyl chloride, adipoyl chloride, or mixtures thereof. Although some examples of the diacid chlorides are described herein, any diacid can be selected.

In some other examples, suitable diacids that can be used in the disclosed methods are represented by Formula V-A:

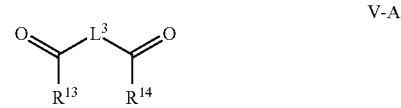

V-A wherein

L$^3$ can be substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ Scheme 1: Synthetic route for preparation of ionic polyamides.

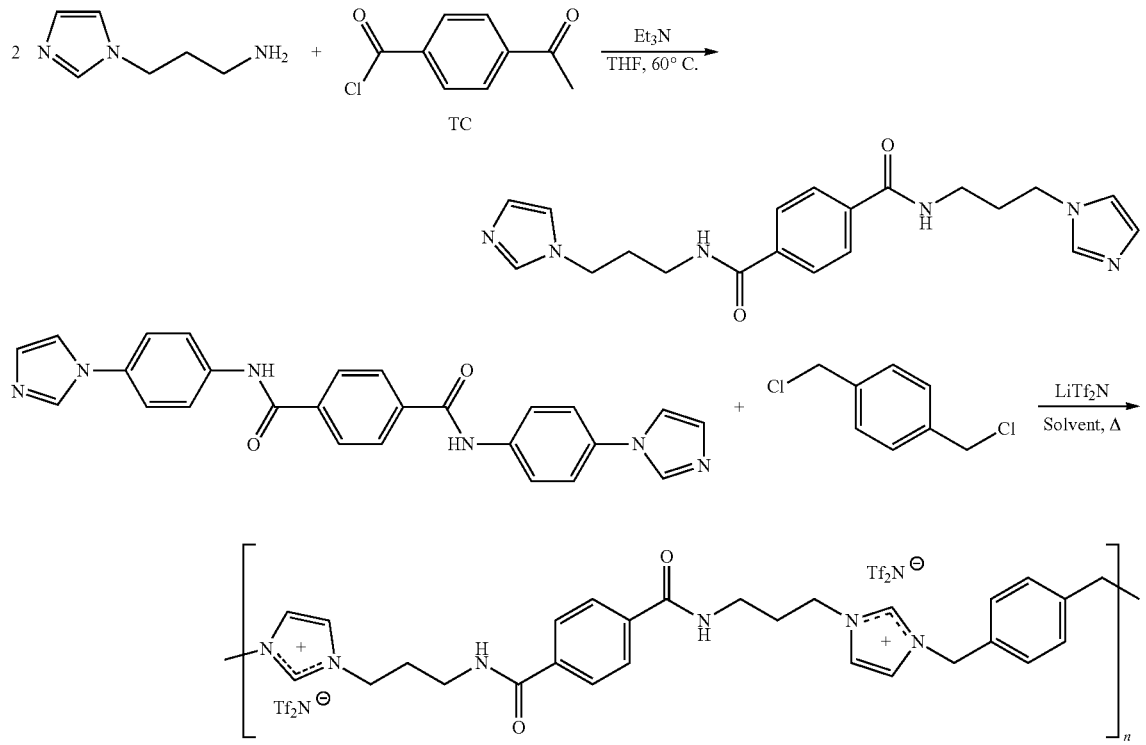

heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and $R^{12}$ and $R^{13}$ are, independent of any other, a leaving group and can include OH or a halogen such as F, Cl, Br, or I.

Amine

The disclosed methods also use an amine to prepare the polyamides. In some embodiments, a diamine is not utilized. For instance, the reaction between a diamine and a diacid can cause polymerization. Instead, if a molecule with a single amine functional group (monoamine) is used, polymerization is disfavored. A reaction between two molecules that comprise a monoamine and a diacid results in a monomer containing two amide functional groups. (See Scheme 1.) This monomer can act as a "bridge" between the ionized groups.

Attached to the amine can be a functional group that is capable of ionizing. One such class of compounds that can be ionized are heteroaryls or heteroalkyls. If the amine functional group is tethered to a heteroaryl, it provides a molecule that can generate an amide monomer while still having the capability to be ionized. (See Scheme 2.)

In some examples, suitable amines that can be used in the disclosed methods are represented by Formula V-B:

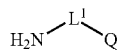

V-B wherein $L^1$ can be a bond, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is substituted or unsubstituted pyrazoles, substituted or unsubstituted pyridines, substituted or unsubstituted pyrazines, substituted or unsubstituted pyrimidines, substituted or unsubstituted pryidazines, substituted or unsubstituted piperidines, substituted or unsubstituted pyrrolidines, substituted or unsubstituted indolizines, substituted or unsubstituted isoindoles, substituted or unsubstituted indoles, substituted or unsubstituted indazoles, substituted or unsubstituted imidazoles, substituted or unsubstituted oxazoles, substituted or unsubstituted triazoles, substituted or unsubstituted tetrazoles, substituted or unsubstituted thiazoles, substituted or unsubstituted purines, substituted or unsubstituted isoquinolines, substituted or unsubstituted quinolines, substituted or unsubstituted phthalazines, substituted or unsubstituted quinooxalines, substituted or unsubstituted phenazines, substituted or unsubstituted morpholinines, substituted or unsubstituted heteroalkyl, or mixtures thereof, wherein any of the substituted groups named can be substituted with one or more alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

Scheme 2. Some non-limiting examples of amines that can be utilized in the synthesis of ionic polyamides.

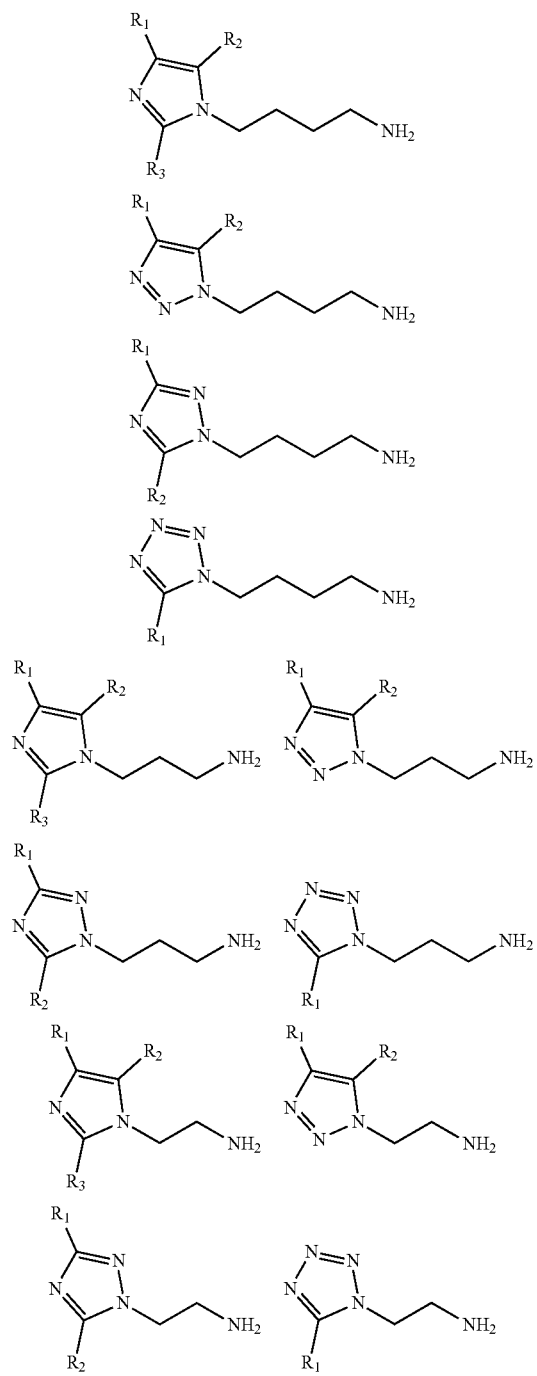

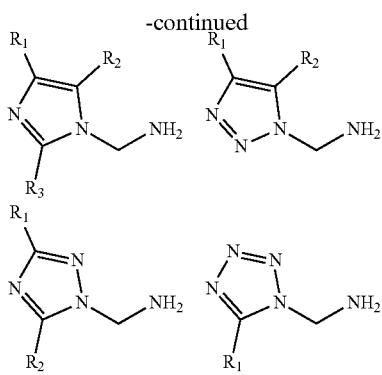

Some suitable classes of amines are shown in Scheme 2. The amine can be attached to a variety of heteroaryls, such as but not limited to, azoles, imidazoles, 1,2,3-triazoles, 1,2,4-triazoles, tetrazoles, pyridines, piperidines, pyrrolidines, and pyrazoles. The heteroaryls can be substituted with one or more functional groups, such as alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

The amine group can be directly attached to the heteroaryl or attached by a bridge. The bridge can be attached to a heteroatom or any one of the carbon atoms on the heteroaryl. The resulting reaction between the amine and the diacid can generate a bridging monomer, which can be polymerized through a reaction with an alkylating agent.

In some embodiments, an amine attached to a leaving group (instead of the ionizable heteroaryl or heteroalkyl) can react with the diacid to form an amide. In these embodiments, suitable amines attached to a leaving group can be represented by Formula VI:

$$H_2N^{L^1}X \qquad VI$$

wherein $L^1$ can be a bond, $CH_2$, $C(O)$, $O$, $S$, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and X is a leaving group such as Cl, Br, I, OH, O-Ph-$SO_3CH_3$, $SO_3CH_3$, or $SO_3CH_3$.

The leaving group, X can then react with an ionizable heteroaryl or heteroalkyl, Q, as described herein to form the bridging monomer.

Alkylating Agent

If the alkylating agent is capable of two alkylation reactions, the alkylating agent can serve to connect the bridging monomers into dimers, trimers, and ultimately a polymer. The growth of the polymer can result from such a reaction as disclosed herein.

In some examples, suitable alkylating agents that can be used in the disclosed methods are represented by Formula VII:

$$X^{L^2}X \qquad VII$$

wherein $L^2$ can be substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and X is a leaving group such as Cl, Br, I, OH, O-Ph-$SO_3CH_3$, $SO_3CH_3$, or $SO_3CH_3$.

A suitable bridge can connect the two leaving groups. The bridge can be selected based on its impact on chemical or physical properties of the resulting polymer. The bridge can comprise alkyl, alkenyl, alkynyl, aryl, ether, or ester functionality.

Possible examples of suitable alkylating agents are show in Scheme 3. In some aspects, the alkylating agent comprises at least two leaving groups. Some leaving groups include, but are not limited to, chlorine, bromine, iodine, methanesulfonyl (mesylate), trifluoromethanesulfonyl (triflate), or p-toluenesulfonyl (tosylate). A substitution reaction can take place between the alkylating agent and the ionizable heteroaryl as described above. This substitution reaction can result in the heteroaryl reacting with the carbon atom directly next to one of the leaving groups, which can result in a cationic heteroaryl and the leaving group as an anion. The reaction between the alkylating agent and the bridging monomer can generate an ionic polyamide. (See Scheme 1.)

Scheme 3. Some non-limiting examples of alkylating agents that can be utilitzed in the synthesis of ionic polyamides. X represents a leaving group.

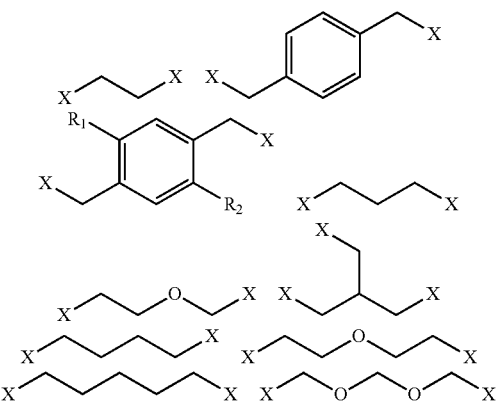

-continued

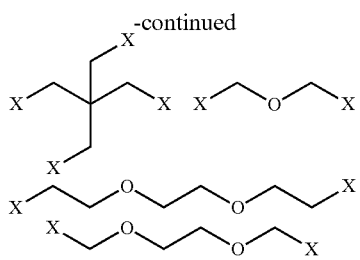

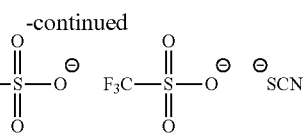

Anions

The leaving groups can be used as an anion for the cationic monomer as a byproduct of the reaction between the alkylating agent and the bridging monomer. In some aspects, the anion can be exchanged for another anion that can be improve properties, such as viscosity, $CO_2$ affinity, or melting point. The anion can be exchanged by methods known to a person skilled in the art.

Some suitable anions that can be utilized can be seen in Scheme 4. In some aspects the anion can be chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, or tosylate.

Scheme 4. Some possible anions that can be used in the synthesis of ionic polyamides.

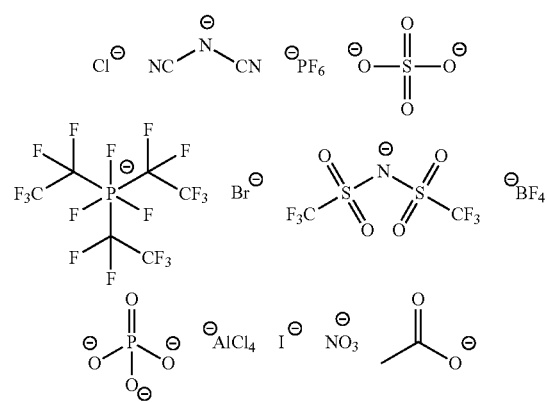

The disclosed methods for synthesizing the ionic polyamides can be illustrated by Scheme 1. The reaction can be performed neat or in in a solvent. The reaction can be optionally heated. After an optional removal of the solvent, the resulting molecule can be a bridging monomer comprising two amide functional groups and two ionizable heteroaryls. Some suitable solvents for preparing the polyamides include, but are not limited to water, dichloromethane, chloroform, ethyl acetate, tetrahydrofuran, acetone, acetonitrile, N,N-dimethylformamide, or dimethyl sulfoxide. The reaction can also be optionally heated up to 150° C. The reaction mixture can be stirred and heated for up to 48 hours to generate the bridging monomer. After the removal the solvent and generated water, the bridging monomer can be isolated.

The monomeric amide, or bridging monomer, can also be synthesized by a multi-step reaction. The diacid can be mixed with two molar equivalents of the amine attached to a leaving group in a suitable solvent. The amine functional group can react with the diacid functional group to form an amide functional group and a molecule of water, which can be removed with the solvent. The resulting compound can be reacted with two equivalents of heteroaryl to form the bridging monomer.

The synthesized bridging monomer can be ionized through an alkylation reaction with a suitable alkylating agent as described above (see e.g., Scheme 3). The bridging monomer can be mixed with the alkylating agent in a suitable solvent. The attached heteroaryl can react with the carbon atom next to one of the leaving groups. This alkylation reaction can positively ionize the bridging monomer and generate a negatively charged anion from leaving group (Scheme 5). By selecting an alkylating agent with at least two leaving groups connected by a suitable bridge as described above, the alkylation reaction can result in the step-growth of a polymer. In some aspects the alkylation reaction forms a dimer, trimer, or a longer polymer.

Scheme 5. Example of alkylation reaction to synthesize an ionic polyamide; n represents the number of repeating monomer units

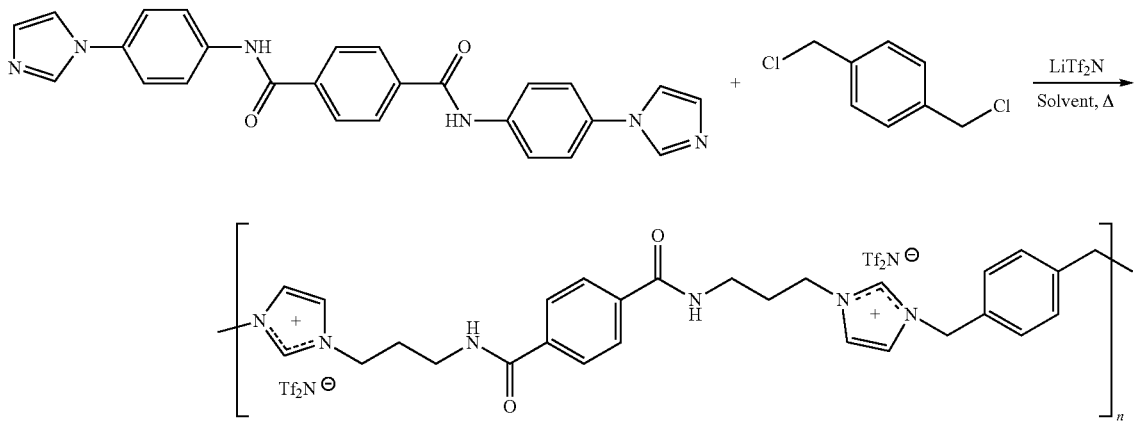

Some suitable solvents include, but are not limited to water, methanol, ethanol, dichloromethane, chloroform, ethyl acetate, tetrahydrofuran, acetone, acetonitrile, N,N-dimethylformamide, or dimethyl sulfoxide. The reaction can also be optionally heated up to 150° C. The reaction mixture can be stirred and heated for up to 48 hours to generate the alkylated polymer. A person skilled in the art would know other conditions for the reaction. After, the removal the solvent and generated water, the bridging ionic polyamide can be isolated.

Optionally, a salt can be added to the alkylation reaction mixture to change the identity of the anion. For example, instead of having the anionic version of the leaving group, the anion could be exchanged for another anion, such as but not limited to chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, inflate, or tosylate.

Ionic Polyamide-Imide

Also, disclosed herein are methods for synthesizing an ionic polyamide-imide. In some embodiments, the methods can comprise at least four components: (1) an acid-anhydride comprising an acid functional group and an anhydride functional group, (2) an amine tethered to an ionizable heteroaryl, (3) an alkylating agent, and (4) an anion. In some aspects, the disclosed method can generate an ionic polyamide-imide by reacting the acid-anhydride with the amine tethered to an ionizable heteroaryl to generate a bridging monomer. (See Scheme 6.) The bridging monomer can be reacted with an alkylating reagent to generate a repeating pattern. The anion can be optionally exchanged.

Acid-Anhydride

As described herein, the acid-anhydride can include an acid functional group and an anhydride functional groups. The molecular structure between the acid and anhydride functional groups can be altered to adjust the resulting ionic polyamide-imide's properties, such as thermal stability, chemical reactivity, viscosity, and melting point, among other chemical and physical properties.

In some examples, suitable acid-anhydrides that can be used in the disclosed methods are represented by Formula VIII:

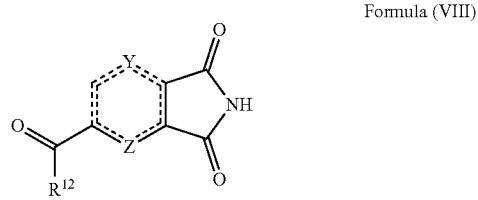

Formula (VIII)

wherein each dotted line represents an optional bond;

Y is null, a bond, hydrogen, halogen, OH, CH, $CH_2$, C(O), O, S, $SO_2$, CN, N, NH, $NH_2$, substituted amine, hydroxyl, alkoxy, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Z is CH, $CH_2$, C(O), O, S, $SO_2$, N, NH, $NH_2$, CN, alkoxy, substituted amine, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from a hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and $R^{12}$ is a leaving group such as OH or a halogen such as F, Cl, Br, or I.

Suitable alkylating agents and amines for preparing the polyamide-imides are as disclosed herein.

The disclosed methods for synthesizing the ionic polyamide-imides can be illustrated by Scheme 6. The reaction can be performed neat or in in a solvent. The reaction can be optionally heated. After an optional removal of the solvent, the resulting molecule can be a bridging monomer comprising an amide and an imide functional groups and two ionizable heteroaryls. An alkylating agent with at least two leaving groups can connect two monomers of the bridging monomer through a substitution reaction. This reaction can create a positively charged dimer, trimer, or polymer paired with a suitable anion. This can represent a step-growth polymerization method.

Scheme 6. Preparation of polyamide-imides.

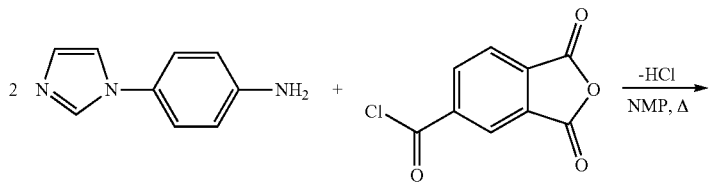

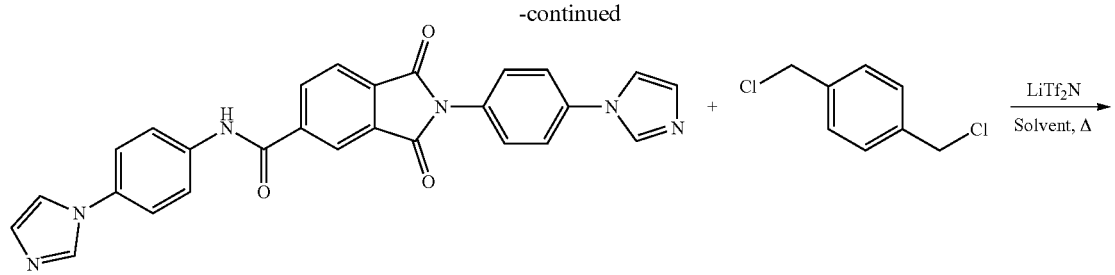

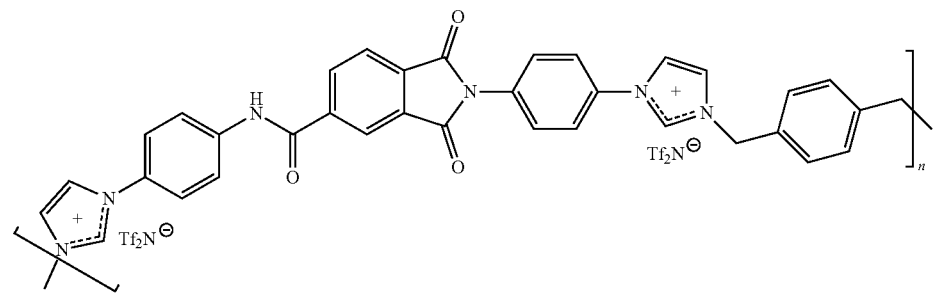

In some other aspects, the disclosed methods for synthesizing the ionic polyamide-imide comprising an ionized heteroaryl can comprise the components: (1) a diacid comprising two acid functional groups, (2) an amine tethered to an ionizable heteroaryl, (3) an alkylating comprising an anhydride group, and (4) an anion. The methods can generate an ionic polyamide-imide by reacting the diacid with the amine tethered to an ionizable heteroaryl to generate a bridging monomer (See Scheme 1). The bridging monomer can be reacted with an alkylating agent comprising an anhydride group to generate a repeating pattern of the ionic polyamide-imide (See Scheme 7). The anion can be optionally exchanged.

Alkylating Agent Comprising Anhydride Functional Group

As described herein, the alkylating agent can include an anhydride functional group. In these examples, the alkylating agent can be represented by Formula IX:

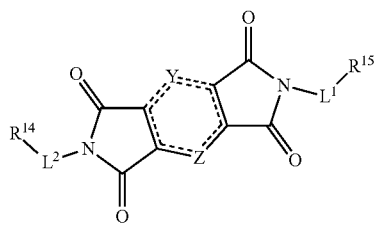

Formula (IX)

wherein, $L^1$ can be a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

$L^2$ can be a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

Y and Z can be, independent of any other, a bond, hydrogen, halogen, hydroxyl, carbonyl, O, S, $SO_2$, cyano, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, and C(X) wherein X is selected from a hydrogen, halogen, hydroxyl, alkyl, or haloalkyl; and $R^{14}$ and $R^{15}$ can be, independent of any other, Cl, Br, I, O, O-Ph-$SO_3CH_3$, $SO_3CH_3$, or $SO_3CH_3$.

The method according to Scheme 7 can be performed neat or in in a solvent. The reaction can be optionally heated. The method can include forming a bridging monomer as described in Scheme 1. An alkylating agent comprising an anhydride and has at least two leaving groups (Formula IX) can connect two monomers of the bridging monomer through a substitution reaction. This reaction can create a positively charged dimer, trimer, or polymer paired with a suitable anion. This can represent a step-growth polymerization method.

Scheme 7. Preparation of polyamide-imides.

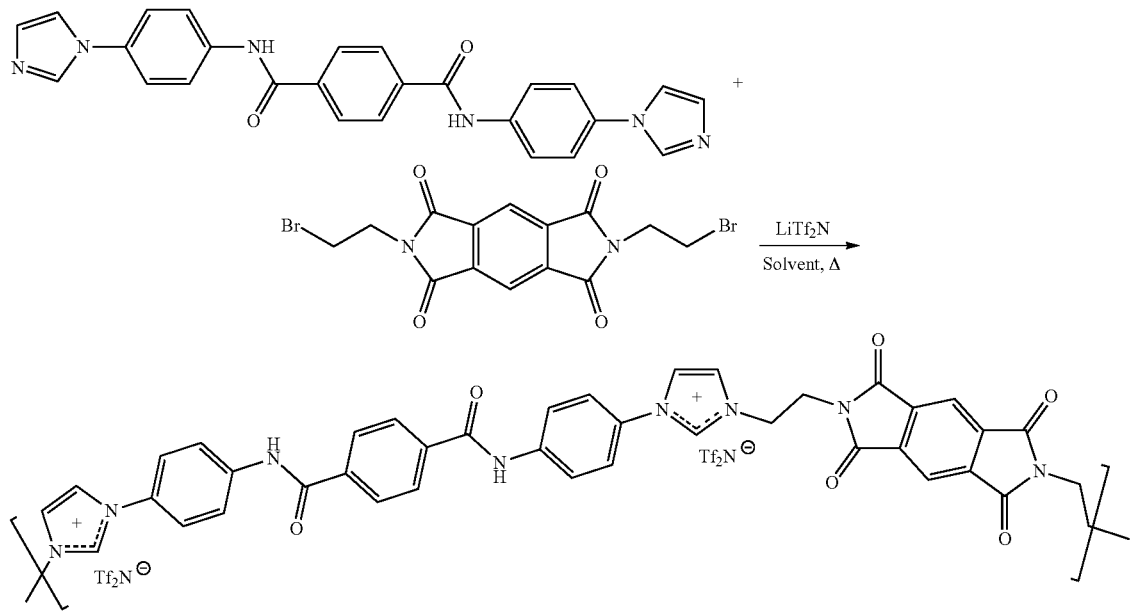

Some suitable solvents for preparing the ionic polyamide-imides include, but are not limited to water, dichloromethane, chloroform, ethyl acetate, tetrahydrofuran, acetone, acetonitrile, N,N-dimethylformamide, or dimethyl sulfoxide. The reaction can also be optionally heated up to 150° C. The reaction mixture can be stirred and heated for up to 48 hours to generate the bridging monomer.

Metathesis Reaction

Instead of exchanging the anion during the alkylation reaction (during preparation of the polyamides or polyamide-imides), the anion can also be optionally exchanged in a separate reaction after the end of the alkylation reaction. Mixing the ionic polyamide or polyamide-imide with a salt that has a different anion can exchange one anion for another. For example, the anion could be exchanged for another anion, such as but not limited to chloride, bromide, iodide, nitrate, dicyanamide, acetate, bis(trifluoromethane) sulfonamide, hexafluorophosphate, tetrafluoroborate, sulfate, phosphate, tris(perfluoroalkyl)trifluorophosphatemesylate, aluminum chloride, thiocyanide, mesylate, triflate, or tosylate.

Some suitable solvents for the metathesis include, but are not limited to water, methanol, ethanol, dichloromethane, chloroform, ethyl acetate, tetrahydrofuran, acetone, acetonitrile, N,N-dimethylformamide, or dimethyl sulfoxide. The reaction can also be optionally heated up to 150° C.

Compositions of Ionic Liquids

The ionic polyamide or polyamide-imide can be mixed with an ionic liquid. Some suitable examples are provided herein.

The term "ionic liquid" has many definitions in the art, but is used herein to refer to salts (i.e., compositions comprising cations and anions) that are liquid at a temperature of at or below about 150° C., e.g., at or below about 120, 100, 80, 60, 40, or 25° C. That is, at one or more temperature ranges or points at or below about 150° C. the disclosed ionic liquid compositions are liquid; although, it is understood that they can be solids at other temperature ranges or points. Since the disclosed ionic liquid compositions are liquid, and thus not crystalline solids, at a given temperature, the disclosed compositions do not suffer from the problems of polymorphism associated with crystalline solids. An ionic liquid is not considered a mere solution containing ions as solutes dissolved therein.

The use of the term "liquid" to describe the disclosed ionic liquid compositions is meant to describe a generally amorphous, non-crystalline, or semi-crystalline state. For example, while some structured association and packing of cations and anions can occur at the atomic level, the disclosed ionic liquid compositions have minor amounts of such ordered structures and are therefore not crystalline solids. The compositions disclosed herein can be fluid and free-flowing liquids or amorphous solids such as glasses or waxes at a temperature at or below about 150° C. In particular, examples disclosed herein, the disclosed ionic liquid compositions are liquid at which the composition is applied (i.e., ambient temperature).

Further, the disclosed ionic liquid compositions are materials composed of at least two different ions; each of which can independently and simultaneously introduce a specific characteristic to the composition not easily obtainable with traditional dissolution and formulation techniques. Thus, by providing different ions and ion combinations, one can change the characteristics or properties of the disclosed ionic liquid compositions in a way not seen by simply preparing various crystalline salt forms. Examples of characteristics that can be controlled in the disclosed compositions include, but are not limited to, melting, solubility control, and rate of dissolution. It is this multi-nature/functionality of the disclosed ionic liquid compositions which allows one to fine-tune or design in very specific desired material properties.

It is further understood that the disclosed ionic liquid compositions can include solvent molecules (e.g., water); however, these solvent molecules should not be present in excess in the sense that the disclosed ionic liquid compositions are dissolved in the solvent, forming a solution. That is, the disclosed ionic liquid compositions contain no or minimal amounts of solvent molecules that are free and not bound or associated with the ions present in the ionic liquid composition. Thus, the disclosed ionic liquid compositions can be liquid hydrates or solvates, but not solutions.

Ionic liquids have been of general interest because they are environmentally-friendly alternatives to organic solvents for various chemical processes, e.g., liquid/liquid extractions, catalysis, separations, and electrochemistry. Ionic liquids have also become popular alternative media for chemical synthesis because of their low volatility and low toxicity. See e.g., Wasserscheid and Keim, *Angew Chem Int Ed Engl*, 2000, 39:3772; and Wasserscheid, "Ionic Liquids in Synthesis," 1$^{st}$ Ed., Wiley-VCH, 2002. Further, ionic liquids can reduce costs, disposal requirements, and hazards associated with volatile organic compounds. Other exemplary properties of ionic liquids are high ionic conductivity, non-volatility, non-flammability, high thermal stability, wide temperature for liquid phase, highly solvability, and non-coordinating. For a review of ionic liquids see, for example, Welton, *Chem Rev.* 1999, 99:2071-2083; and Carlin et al., Advances in Nonaqueous Chemistry, Mamantov et al. Eds., VCH Publishing, New York, 1994.

The specific physical properties (e.g., melting point, viscosity, density, water solubility, etc.) of ionic liquids are determined by the choice of cation and anion, as is disclosed more fully herein. As an example, the melting point for an ionic liquid can be changed by making structural modifications to the ions or by combining different ions. Similarly, the particular chemical properties (e.g., bioactivity, toxicity, pharmacokinetics, etc.), can be selected by changing the constituent ions of the ionic liquid.

The disclosed ionic liquids care liquid at some temperature range or point at or below about 150° C. For example, the disclosed ionic liquids can be a liquid at or below about 150, 149, 148, 147, 146, 145, 144, 143, 142, 141, 140, 139, 138, 137, 136, 135, 134, 133, 132, 131, 130, 129, 128, 127, 126, 125, 124, 123, 122, 121, 120, 119, 118, 117, 116, 115, 114, 113, 112, 111, 110, 109, 108, 107, 106, 105, 104, 103, 102, 101, 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0, −1, −2, −3, −4, −5, −6, −7, −8, −9, −10, −11, −12, −13, −14, −15, −16, −17, −18, −19, −20, −21, −22, −23, −24, −25, −26, −27, −28, −29, or −30° C., where any of the stated values can form an upper or lower endpoint when appropriate. In further examples, the disclosed ionic liquids can be liquid at any point from about −30° C. to about 150° C., from about −20° C. to about 140° C., −10° C. to about 130° C., from about 0° C. to about 120° C., from about 10° C. to about 110° C., from about 20° C. to about 100° C., from about 30° C. to about 90° C., from about 40° C. to about 80° C., from about 50° C. to about 70° C., from about −30° C. to about 50° C., from about −30° C. to about 90° C., from about −30° C. to about 110° C., from about −30° C. to about 130° C., from about −30° C. to about 150° C., from about 30° C. to about 90° C., from about 30° C. to about 110° C., from about 30° C. to about 130° C., from about 30° C. to about 150° C., from about 0° C. to about 100° C., from about 0° C. to about 70° C., from about 0° to about 50° C., and the like.

Further, in some examples the disclosed ionic liquid compositions can be liquid over a wide range of temperatures, not just a narrow range of, say, 1-2 degrees. For example, the disclosed ionic liquid compositions can be liquids over a range of at least about 4, 5, 6, 7, 8, 9, 10, or more degrees. In other example, the disclosed ionic liquid compositions can be liquid over at least about an 11, 12, 13, 14, 15, 16, 17, 18, 19, 20, or more degree temperature range. Such temperature ranges can begin and/or end at any of the temperature points disclosed in the preceding paragraph.

In many examples disclosed herein the disclosed ionic liquid compositions are liquid at the temperature at which they will be used or processed (e.g., ambient temperature). In still other examples, the disclosed compositions can be liquid at the temperature at which they are formulated or processed.

It is understood, however, that the disclosed ionic liquid compositions can, though need not, be solubilized, and solutions of the disclosed ionic liquids are contemplated herein. Further, the disclosed ionic liquid compositions can be formulated in an extended or controlled release vehicle, for example, by encapsulating the ionic liquids in microspheres or microcapsules using methods known in the art. Still further, the disclosed ionic liquid compositions can themselves be solvents for other solutes. For example, the disclosed ionic liquids can be used to dissolve a particular nonionic or ionic active. These and other formulations of the disclosed ionic liquids are disclosed elsewhere herein.

In some examples, the disclosed ionic liquids are not solutions where ions are dissolved in a solute. In other examples, the disclosed ionic liquid compositions do not contain ionic exchange resins. In still other examples, the disclosed ionic liquids are substantially free of water. By substantially free is meant that water is present at less than about 10, 9, 8, 7, 6, 5, 4, 3, 2, 1, 0.5, 0.25, or 0.1 wt. %, based on the total weight of the composition.

Cations

Particular examples of cationic compounds that can be present in the disclosed compositions are compounds that contain nitrogen or phosphorus atoms. Nitrogen atom-containing groups can exist as neutral or can be converted to positively-charged quaternary ammonium species, for example, through alkylation or protonation of the nitrogen atom. Thus, compounds that possess a quaternary nitrogen atom (known as quaternary ammonium compounds (QACs)) are typically cations. According to the methods and compositions disclosed herein, any compound that contains a quaternary nitrogen atom or a nitrogen atom that can be converted into a quaternary nitrogen atom can be a suitable cation for the disclosed compositions. In some examples, the cation is not a protonated tertiary amine, a protonated heteroarylamine, a protonated pyrrolidine, or a metal.

Some specific QACs suitable for use herein are aliphatic heteroaryls. An aliphatic heteroaryl cation is a compound that comprises at least one aliphatic moiety bonded to a heteroaryl moiety. In the aliphatic heteroaryl cation, the aliphatic moiety can be any alkyl, alkenyl, alkynyl, heteroalkyl, heteroalkenyl, heteroalkynyl, cycloalkyl, cycloalkenyl, heterocycloalkyl, or heterocycloalkenyl group, as described herein. For example, the aliphatic moiety can include substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl substituted or unsubstituted $C_{2-20}$ heteroalkenyl, or substituted or unsubstituted $C_{2-20}$ heteroalkynyl groups. In the aliphatic heteroaryl cations, the aliphatic moiety is bonded to a heteroatom in the heteroaryl moiety.

In the aliphatic heteroaryl cation, the heteroaryl moiety can be any heteroaryl moiety as described herein. For example, the heteroaryl moiety can be an aryl group having one or more heteroatoms (e.g., nitrogen, oxygen, sulfur, phosphorous, or halonium). Examples of specific heteroaryl moieties that can be used in the aliphatic heteroaryl cations include, but are not limited to, substituted or unsubstituted pyrazoles, substituted or unsubstituted pyridines, substituted or unsubstituted pyrazines, substituted or unsubstituted pyrimidines, substituted or unsubstituted pryidazines, substituted or unsubstituted indolizines, substituted or unsubstituted isoindoles, substituted or unsubstituted indoles, substituted or unsubstituted indazoles, substituted or unsubstituted imidazoles, substituted or unsubstituted oxazoles, substituted or unsubstituted triazoles, substituted or unsubstituted thiazoles, substituted or unsubstituted purines, substituted or unsubstituted isoquinolines, substituted or unsubstituted quinolines, substituted or unsubstituted phthalazines, substituted or unsubstituted quinooxalines, substituted or unsubstituted phenazine, and the like, including derivatives and mixtures thereof. In the aliphatic heteroaryl cations, a heteroatom in the heteroaryl moiety is bonded to the aliphatic moiety. When the heteroatom of the heteroaryl is nitrogen, this forms a quaternary ammonium cation, as described herein.

Further examples of aliphatic heteroaryl cations include substituted or unsubstituted benztriazoliums, substituted or unsubstituted benzimidazoliums, substituted or unsubstituted benzothiazoliums, substituted or unsubstituted pyridiniums, substituted or unsubstituted pyridaziniums, substituted or unsubstituted pyrimidiniums, substituted or unsubstituted pyraziniums, substituted or unsubstituted imidazoliums, substituted or unsubstituted pyrazoliums, substituted or unsubstituted oxazoliums, substituted or unsubstituted 1,2,3-triazoliums, substituted or unsubstituted 1,2,4-triazoliums, substituted or unsubstituted thiazoliums, substituted or unsubstituted piperidiniums, substituted or unsubstituted pyrrolidiniums, substituted or unsubstituted quinoliums, and substituted or unsubstituted isoquinoliums.

Tetraalkyl Ammonium

The disclosed compositions can also comprise a tetraalkyl ammonium cation.

Suitable tetraalkyl ammonium cations comprise four alkyl moieties, as disclosed herein. In one example, a tetraalkyl ammonium cation can comprise one long chain alkyl moiety (e.g., 10 or more carbon atoms in length) and three short chain alkyl moieties (e.g., less than 10 carbon atoms in length).

Some specific examples of tetraalkyl ammonium cations that can be included in the disclosed compositions include, but are not limited to, cetyl trimethyl ammonium, lauryl trimethyl ammonium, myristyl trimethyl ammonium, stearyl trimethyl ammonium, arachidyl trimethyl ammonium, or mixtures thereof. Other examples include, but are not limited to, cetyl dimethylethyl ammonium, lauryl dimethylethyl ammonium, myristyl dimethylethyl ammonium, stearyl dimethylethyl ammonium, arachidyl dimethylethyl ammonium, or mixtures thereof.

Anions

Some suitable anions include, but are not limited to, chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, or tosylate.

Compositions of Ionic Polyamides or Polyamide-Imides and Ionic Liquids

An additional dimension of control over material structure, properties and performance can be the introduction of "free" IL into the polyamide or polyamide-imide polymer matrix that can further serve to aid assembly via selective, non-covalent interactions with the ionic segments of the polymer backbone. This concept has been applied to amorphous "side-chain" poly(ILs) and ionenes to improve $CO_2$ permeability compared to the neat polymer material alone. Lodge and co-workers have successfully applied such approaches to the self-assembly of linear block copolymers containing polar or ionic blocks within non-polar polystyrene blocks, with promising results for a $CO_2$ separation membrane. (See He et al., *J. Am. Chem. Soc.* 128 (2006) 2745-50.) However, although such polymer materials exhibit improved performance when ILs are included in the membrane, they can be largely composed of a relatively impermeable poly(styrene) component, can rely on radical polymerization mechanisms and can lack the unique folds and twists that can be imparted by some molecules like 6-FDA. Thus the introduction of "free" ILs into ionic polyamides or polyamide-imides can provide the driving force needed create highly open, yet ordered nanostructures.

Articles of Ionic Polyamides or Polyamide-Imides and Ionic Liquids

The ionic polymers described herein can be used in various articles. The article can be a resin composition, a fabric, a building material, a flooring material, a composite material, a dense fiber, a hollow fiber, a bundle of fibers, a film, a block, a tube, or a sheet.

In some examples, the ionic polyamides or polyamide-imides can be used in membranes for capturing gases. These compositions are useful for reducing volatile compounds, such as carbon dioxide ($CO_2$), carbon monoxide (CO), sulfur dioxide ($SO_2$), hydrogen sulfide ($H_2S$), nitrogen oxide (NO), nitrogen dioxide ($NO_2$), carbonyl sulfide (COS), and carbon disulfide ($CS_2$), mercaptans, $H_2O$, $O_2$, $H_2$, $N_2$, $C_1$-$C_8$ hydrocarbons (e.g., methane and propane), volatile organic compounds, and mixtures of these and other volatile compounds from gas streams and liquid streams.

Also disclosed herein are methods to capture gases utilized disclosed compositions. The method can include contacting a gas stream with a membrane comprising an ionic polyamide or polyamide-imide can result in the absorption of volatile compounds. Contacting a gas stream with a membrane comprising an ionic polyamide or polyamide-imide and an ionic liquid can result in the absorption of volatile compounds.

In some examples, the ionic polyamides or polyamide-imides can be used in resin compositions such as three dimensional printing inks. The three-dimensional printable resin composition can comprise an ionic polyamide or polyamide-imide as disclosed herein and a carrier. In some examples, the three dimensional printing ink can include the ionic polyamide or polyamide-imide in an amount of from 1% to 100% by weight, based on the total weight of the three-dimensional printable ink composition.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

All chemicals used were of analytical grade, purchased from Sigma-Aldrich (St. Louis, Mo.) or Alfa Aesar (Ward Hil, Mass.), and used without further purification unless otherwise noted.

Example 1: Synthesis of Imidazole-Based Diamide

The imidazole-based diamide was produced from the condensation of 1-(3-aminopropyl)imidazole (API) with a di-acid chloride as shown below in Scheme 8 below. API is a versatile precursor for the synthesis of ionic polyimides and ionic polyamides. The primary amine group readily Scheme 8. Imidazole-based diamide synthesized from 1-(3-aminopropyl)-2,4,5-trimethylimidazole and terephthaloyl chloride.

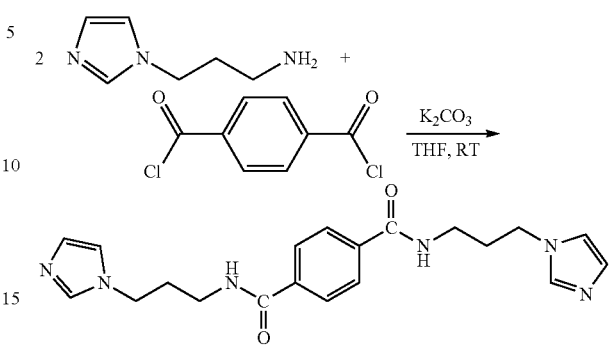

The diamide species can be isolated. Polymerization of the diamide species was carried out through an SN2 reaction between the diamide and a dihalide compound such as p-dichloroxylene as shown in Scheme 9 below.

Scheme 9. imidazole-based diamide synthesized from 1-(3-aminopropyl)-2,4,5-trimethylimidazole and terephthaloyl chloride.

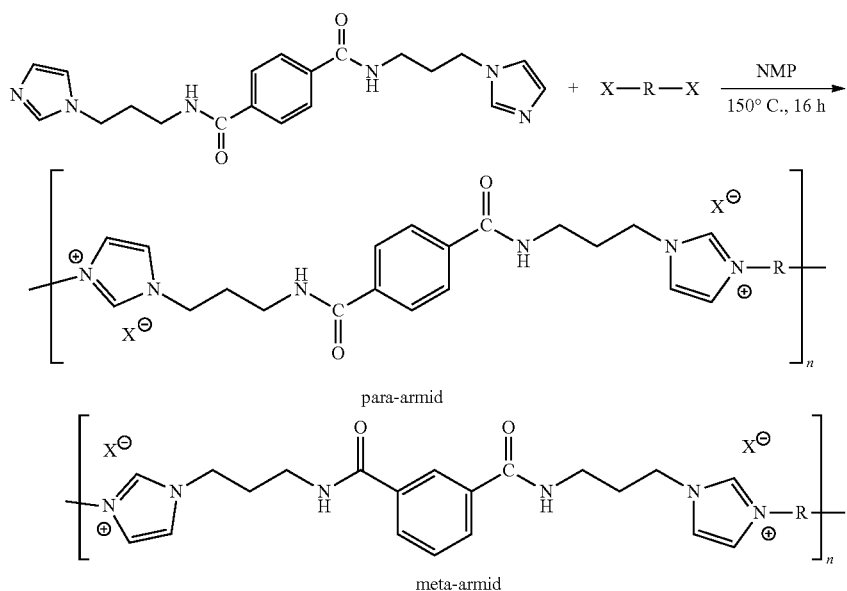

para-armid meta-armid reacts with anhydrides and/or acid chlorides while the imidazole group remains inert during these couplings. This asymmetric activity is useful in the design of bis(imidazole) monomers that will give rise to ionic polyimides and ionic polyamides.

The diacid chloride shown below (terephthaloyl chloride) represents the same para-aramid linkage that is present in Kevlar. A meta-aramid linkage similar to that within Nomex can be achieved when using isopthaloyl chloride. Of course, the structures in Scheme 8 are just two examples from a plethora of possibilities. Unique derivatives of either platform with different physical properties can be produced from the same monomers simply by changing the dihalide compound.

In some cases, excess lithium bistriflimide (LiTf$_2$N) can be dissolved in the reaction medium. The presence of Li$^+$ in solution helps to remove Cl$^-$ through precipitation of LiCl as a byproduct. Furthermore, the Tf$_2$N— anion associates with the imidazolium cations which helps maintain solubility of the growing polymer. With very limited exceptions, the Tf$_2$N-anion is known to be a very weakling-coordinating, non-nucleophilic, weak Brønsted base (conjugate of the HTf$_2$N superacid) that exhibits good chemical, electrochemical and thermal stability and it generally results in very hydrophobic compounds when paired with imidazolium cations.

Post-reaction, the entire mixture is poured into H$_2$O wherein the LiCl byproduct, excess LiTf$_2$N and solvent are separated from the precipitated, hydrophobic ionic polymer. The polymer is further purified through washing and (optionally) re-precipitation.

Example 2: Synthesis of Imidazole-Based Polyamide-Imides

The synthetic methods shown in Schemes 10a and 10b were used to prepare the ionic polyamide-imides (PAI). The first synthetic method (Scheme 10a) used 1-(4-aminophenyl)imidazole and trimellitic anhydride chloride (TAC) in a two-step process wherein the bis(imidazole) amide-imide was isolated, followed by reaction with an aromatic dihalide.

The second alternate method (Scheme 10b) produced ionic poly(amide amide)-(imide imide) (PAAII) materials through the synthesis of two distinct monomers—a bis(imidazole) diamide and a diimide dibromide. The diimide bromide can be produced through a two-step sequence where monoethanolamine first reacts with PMDA to produce a diol diimide species. Treating the diol diimide with HBr in $H_2SO_4$ affords the dibromide diimide compound, which is then reacted with the bis(imidazole) diamide to form ionic PAAII.

Scheme 10a. Synthetic route to ionic PAI materials using TAC as the amide-imide link.

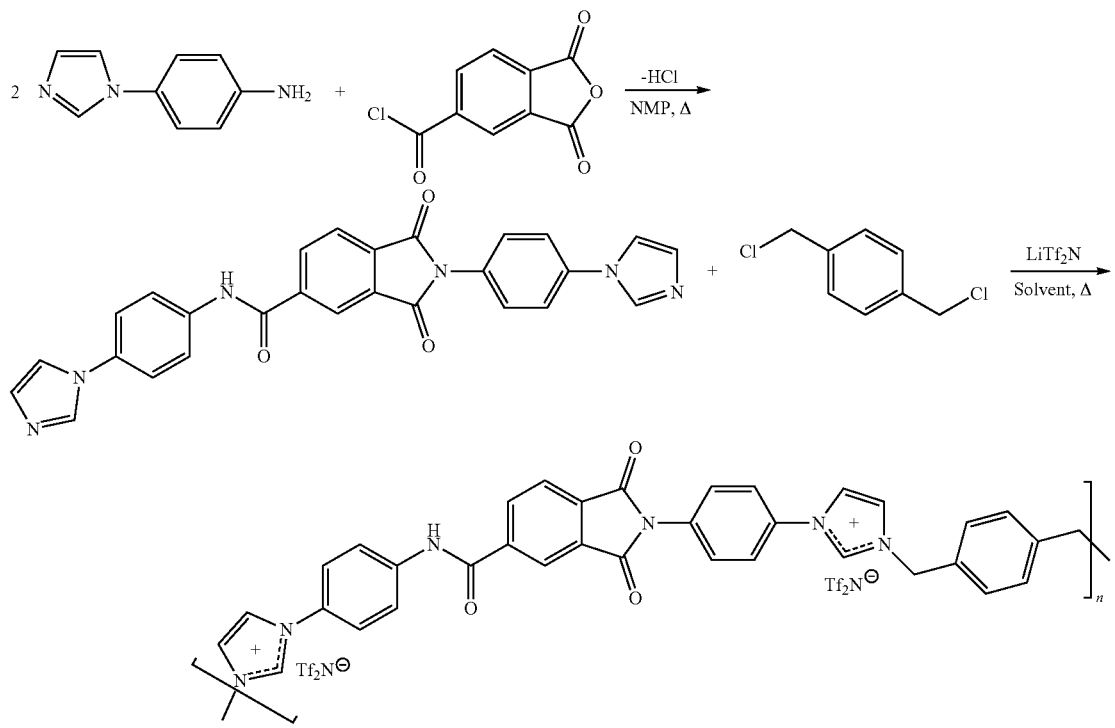

Scheme 10b. Synthetic route to produce ionic PAAII materials with diverse structural components

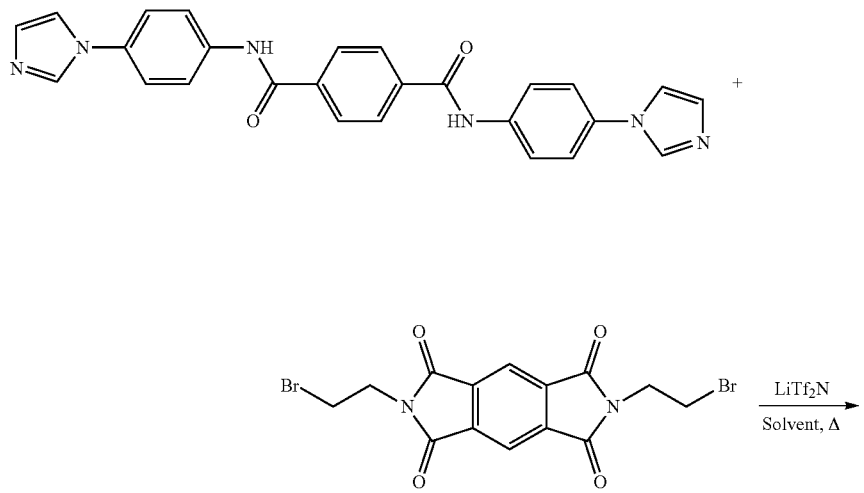

-continued

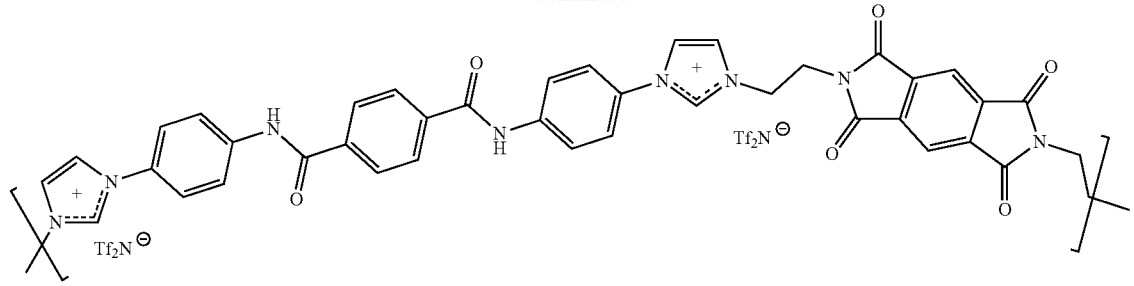

Scheme 10b allows for the nature of the amide and imide segments to be chosen independently, giving rise to a wide range of structural compositions and control over properties. For example, while the example in Scheme 10b shows a diamide and diimide species produced from TC and PMDA, respectively, the amide and imide chemistries could be varied.

What is claimed is:

1. A composition, comprising an ionic polyamide having the formula (I):

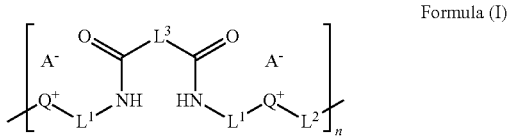

Formula (I)

wherein, $L^1$ is, independently for each occurrence, selected from the group consisting of a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, a polyester, a polyalkyleneoxy, and combinations thereof;

$L^2$ and $L^3$ are independently selected from the group consisting of a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

Q is an ionized heteroaryl, an ionized heterocycloalkyl, or an ionized heteroalkyl;

A is an anion; and n is an integer from 2 to 100,000.

2. The composition of claim 1, wherein
$L^1$ is, independently for each occurrence, selected from the group consisting of a bond, a $C_{1-20}$ alkyl, a $C_{2-20}$ alkenyl, a $C_{1-20}$ heteroalkyl, a substituted or unsubstituted cycloalkyl, a substituted or unsubstituted aryl, a substituted or unsubstituted heteroaryl, a polyalkyleneoxy, and combinations thereof; and $L^2$ and $L^3$ are independently selected from the group consisting of a $C_{1-20}$ alkyl, a $C_{2-20}$ alkenyl, a $C_{2-20}$ alkynyl, a $C_{1-20}$ heteroalkyl, a $C_{2-20}$ heteroalkenyl, a $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof.

3. The composition of claim 1, wherein $L^1$ is, independently for each occurrence, a branched or unbranched $C_{1-12}$ alkyl, a polyethyleneoxy, a polypropyleneoxy, or a substituted or unsubstituted aryl.

4. The composition of claim 1, wherein $L^2$ is a branched or unbranched $C_{1-12}$ alkyl, a substituted or unsubstituted aryl, or a substituted or unsubstituted heteroaryl.

5. The composition of claim 1, wherein $L^3$ is a substituted or unsubstituted cycloalkyl, a substituted or unsubstituted heterocycloalkyl, a substituted or unsubstituted aryl, or a substituted or unsubstituted heteroaryl.

6. The composition of claim 1, wherein Q is an ionized heteroaryl selected from the group consisting of substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, and substituted or unsubstituted morpholininium.

7. The composition of claim 1, wherein Q is an ionized heteroalkyl comprising a $C_3$-$C_{20}$ substituted or unsubstituted ammonium or a $C_3$-$C_{20}$ substituted or unsubstituted phosphonium group.

8. The composition of claim 1, wherein A is selected from chloride, bromide, iodide, nitrate, dicyanamide, acetate, bis(trifluoromethane)sulfonimide, hexafluorophosphate, tetrafluoroborate, sulfate, phosphate, tris(perfluoroalkyl)trifluorophosphatemesylate, aluminum chloride, thiocyanide, mesylate, triflate, or tosylate.

9. The composition of claim 1, wherein the ionic polyamide is selected from the group consisting of:

Formula I-C

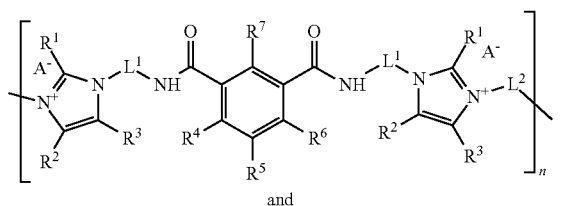

and

Formula I-D

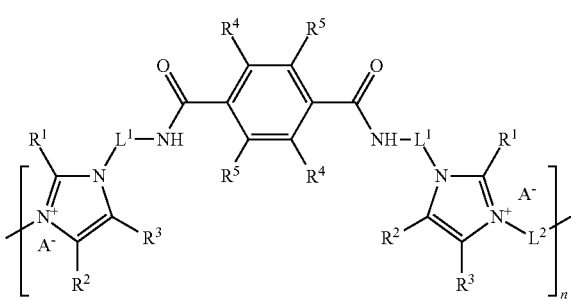

wherein, $L^1$ is, independently for each occurrence, selected from the group consisting of a substituted or unsubstituted cycloalkyl, a substituted or unsubstituted heterocycloalkyl, a substituted or unsubstituted aryl, and a substituted or unsubstituted heteroaryl;

$L^2$ is selected from the group consisting of a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

$R^1$, $R^2$, $R^3$, $R^4$, $R^5$, $R^6$, and $R^7$ are hydrogen; and wherein n is an integer from 2 to 100,000.

10. The composition of claim 1, further comprising an ionic liquid.

11. A three-dimensional printable resin composition comprising the ionic polyamide composition of claim 1 and a carrier.

12. A method for synthesizing an ionic polyamide according to claim 1, comprising:
   (i) reacting a diacid and an amine containing compound, wherein the amine containing compound comprises an amine functional group and an ionizable hetero-functional group, to generate a bridging monomer; and
   (ii) reacting the bridging monomer and an alkylating agent, wherein the alkylating agent ionizes the ionizable hetero-functional group.

13. The method of claim 12, wherein the ionizable hetero-functional group is selected from an ionizable heteroaryl functional group, an ionizable heterocycloalkyl functional group, or an ionizable heteroalkyl functional group.

14. The method of claim 12, wherein the amine containing compound comprises an ionizable heteroaryl functional group selected from imidazole, 1,2,3-triazole, 1,2,4-triazole, tetrazole, pyridine, pyrimidine, piperidine, pyrrolidine, or pyrazole.

15. The method of claim 12, wherein the diacid is selected from terephthaloyl chloride, oxalyl chloride, malonyl chloride, succinyl chloride, glutaryl chloride, adipoyl chloride, pimeloyl chloride, suberoyl chloride, azelaoyl chloride, sebacoyl chloride, isophthaloyl chloride, or mixtures thereof.

16. A composition comprising an ionic polyamide selected from the group consisting of:

Formula (I-A)

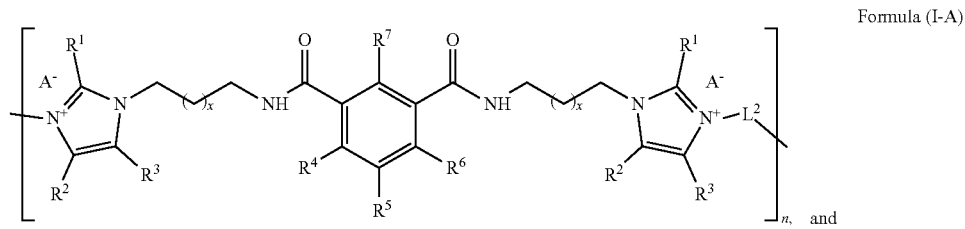

and

Formula (I-B)

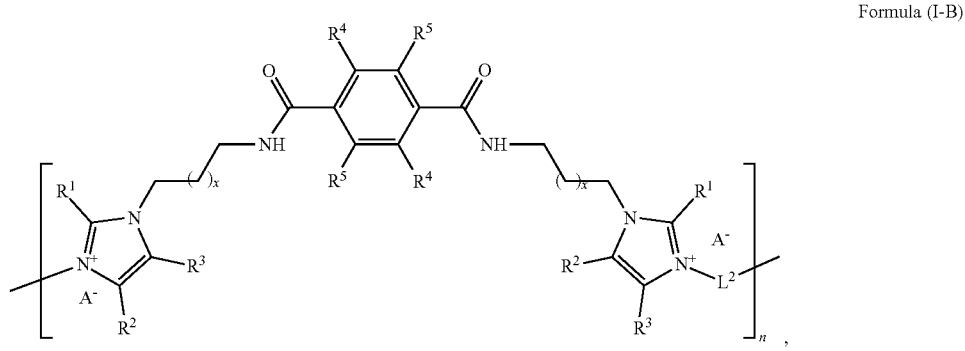

wherein $L_2$ is a bond, $CH_2$, $C(O)$, $O$, $S$, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$R^1$, $R^2$, $R^3$, $R^4$, $R^5$, and $R^6$ are, independent of any other, hydrogen, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$R^7$ is selected from hydrogen, alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol group;

n is an integer from 2 to 100,000; and x is an integer from 0 to 20.

17. A composition, comprising an ionic polyamide-imide having the Formula (II), Formula (III), or Formula (IV):

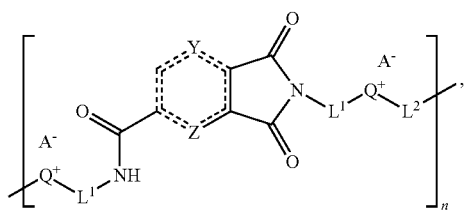

Formula (II)

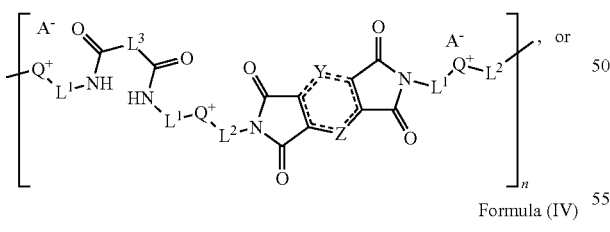

Formula (III)

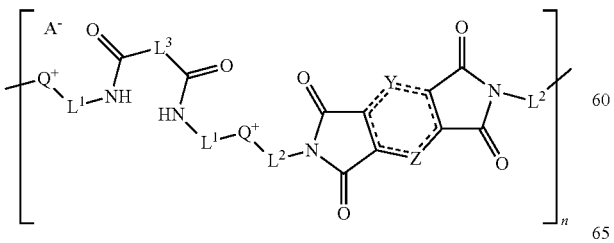

Formula (IV)

wherein, $L^1$ is, independently for each occurrence, selected from the group consisting of a bond, a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

$L^2$ and $L^3$ are, independently for each occurrence, selected from the group consisting of a substituted or unsubstituted $C_{1-20}$ alkyl, a substituted or unsubstituted $C_{2-20}$ alkenyl, a substituted or unsubstituted $C_{2-20}$ alkynyl, a substituted or unsubstituted $C_{1-20}$ heteroalkyl, a substituted or unsubstituted $C_{2-20}$ heteroalkenyl, a substituted or unsubstituted $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof;

Y is null, a bond, hydrogen, halogen, OH, CH, $CH_2$, C(O), O, S, $SO_2$, CN, N, NH, $NH_2$, substituted amine, hydroxyl, alkoxy, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Z is CH, $CH_2$, C(O), O, S, $SO_2$, N, NH, $NH_2$, CN, alkoxy, substituted amine, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, C(X) wherein X is selected from hydrogen, halogen, hydroxyl, alkyl, or haloalkyl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is an ionized heteroaryl, ionized heterocycloalkyl, or ionized heteroalkyl;

A is an anion; and n is an integer from 2 to 100,000.

18. The composition of claim 17, wherein $L^1$ is, independently for each occurrence, selected from the group consisting of a bond, a $C_{1-20}$ alkyl, a $C_{2-20}$ alkenyl, a $C_{1-20}$ heteroalkyl, a substituted or unsubstituted cycloalkyl, a substituted or unsubstituted aryl, a substituted or unsubstituted heteroaryl, and combinations thereof;

$L^2$ is, independently for each occurrence, selected from the group consisting of a $C_{1-20}$ alkyl, a $C_{2-20}$ alkenyl, a $C_{2-20}$ alkynyl, a $C_{1-20}$ heteroalkyl, a $C_{2-20}$ heteroalkenyl, a $C_{2-20}$ heteroalkynyl, a substituted or unsubstituted cycloalkyl, a substituted or unsubstituted heterocycloalkyl, a substituted or unsubstituted aryl, a substituted or unsubstituted heteroaryl, and combinations thereof; and $L^3$ is selected from the group consisting of a $C_{1-20}$ alkyl, a $C_{2-20}$ alkenyl, a substituted or unsubstituted cycloalkyl, a substituted or unsubstituted heterocycloalkyl, a substituted or unsubstituted aryl, and a substituted or unsubstituted heteroaryl.

19. The composition of claim 17, wherein Y and Z are C(X), wherein X is hydrogen, halogen, hydroxyl, alkyl, or haloalkyl.

20. The composition of claim 17, further comprising an ionic liquid.

21. A method for synthesizing an ionic polyamide-imide of claim 17, comprising:
(i) reacting an acid-anhydride containing compound and an amine containing compound to generate a bridging monomer, wherein the acid-anhydride containing compound comprises an acid functional group and an anhydride functional group, and wherein the amine containing compound comprises an amine functional group and an ionizable hetero-functional group; and
(ii) reacting the bridging monomer and an alkylating agent, wherein the alkylating agent ionizes the ionizable hetero-functional group.

22. A method for synthesizing an ionic polyamide-imide of claim 17, comprising:
(i) reacting a diacid and an amine containing compound, wherein the amine containing compound comprises an amine functional group and an ionizable hetero-functional group, to generate a bridging monomer; and
(ii) reacting the bridging monomer and an alkylating agent, wherein the alkylating agent comprises a dianhydride functional group, and wherein the alkylating agent ionizes the ionizable hetero-functional group.

* * * * *